US008606422B2

(12) United States Patent  
Sun et al.

(10) Patent No.: US 8,606,422 B2  
(45) Date of Patent: Dec. 10, 2013

(54) APPLICATION OF PHASOR MEASUREMENT UNITS (PMU) FOR CONTROLLED SYSTEM SEPARATION

(75) Inventors: Kai Sun, Palo Alto, CA (US); Kyeon Hur, Palo Alto, CA (US); Pei Zhange, Palo Alto, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 198 days.

(21) Appl. No.: 12/948,188

(22) Filed: Nov. 17, 2010

(65) Prior Publication Data

US 2012/0123602 A1    May 17, 2012

(51) Int. Cl.  
   *G05B 15/02*    (2006.01)
(52) U.S. Cl.  
   USPC .......................................... 700/292; 702/188
(58) Field of Classification Search  
   USPC ........................................................ 700/294  
   See application file for complete search history.

(56) References Cited

U.S. PATENT DOCUMENTS

| 4,470,091 | A  | * | 9/1984 | Sun et al. ......................... 361/20 |
| 6,144,924 | A  | * | 11/2000 | Dowling et al. ................. 702/60 |
| 7,755,371 | B2 |   | 7/2010 | Wells |
| 7,966,101 | B2 | * | 6/2011 | Mitani et al. .................. 700/287 |
| 7,979,220 | B2 |   | 7/2011 | Scholtz |
| 8,000,914 | B2 | * | 8/2011 | Venkatasubramanian et al. ............................... 702/60 |
| 2007/0219755 | A1 | * | 9/2007 | Williams et al. ............... 702/188 |
| 2009/0216472 | A1 |   | 8/2009 | Zima |
| 2011/0022240 | A1 | * | 1/2011 | Rajapaske ..................... 700/287 |

* cited by examiner

*Primary Examiner* — Kavita Padmanabhan  
*Assistant Examiner* — Patrick Cummins  
(74) *Attorney, Agent, or Firm* — Trego, Hines & Ladenheim, PLLC

(57) ABSTRACT

This invention relates to a PMU-based controlled system separation method to protect against a catastrophic blackout. The method includes the steps of performing an offline analysis of an electrical transmission network to partition generators into a number of coherent groups, performing online monitoring of the transmission network to determine a separation interface and frequencies and damping ratios of dominant inter-area modes, and estimating the risk of system separation to perform real-time control.

19 Claims, 25 Drawing Sheets

APPLICATION OF PHASOR MEASUREMENT UNITS (PMU) FOR CONTROLLED SYSTEM SEPARATION

BACKGROUND OF THE INVENTION

The present invention relates generally to electrical transmission system protection, and more particularly to a phasor measurement units (PMU)-based controlled system separation method to protect against a catastrophic blackout.

A major goal in transmission system protection is to avoid cascading failures. Large power system blackouts, although infrequent, may influence up to tens of millions of people and result in direct costs up to billions of dollars. There are also indirect costs such as possible social disruptions and the propagation of failures into other infrastructures such as communication, water supply, natural gas, and transportation systems. The vital importance of electric power to our society motivates continued attention to maintaining power system stability and developing effective self-healing protection and control strategies to prevent blackouts under major disturbances (either nature or man-made).

Historically, major blackout events started with cascading failures of transmission components in a power system. Those failures were often dependent. The first few failures were mainly caused by unanticipated disturbance events (e.g. short-circuit faults due to tree-to-line contacts and transmission outages due to severe weather conditions); thus, some transmission components became out-of-service thereafter, and as a result, overloads occurred on some other transmission components causing overload protection to trip those components and generate more overloads and failures such that the failures cascaded and spread to a wide area. The cascading failures gradually weakened the connection of the power system and caused unintentional system separation and severe stability problems leading to a large-area blackout.

In recent years, efforts have been made to mitigate cascading failures in order to prevent blackouts. When cascading failures occur, it is difficult for system operators at control centers to take corrective actions in a matter of a few minutes or even seconds; thus, automatic protection and control schemes are required in preventing, slowing, or mitigating cascading failures. These automatic schemes need to be able to strategically coordinate local protection actions at the system level in order to stop the spread of cascading failures effectively. However, protecting interconnected power systems against cascading failures and the stability problems incurred poses a challenge to power system engineers because power systems in the real world are often huge and complex while the time for online computations and decision making for control actions is quite limited.

One of the most severe stability problems that may occur with the spread of cascading failures is loss of synchronism. When cascading failures continuously weaken the power system and impact the connections between interconnected subsystems or control areas, inter-area oscillations will happen and grow. If not damped, oscillations will evolve into angle separation between two or more groups of generators, namely loss of synchronism, to result in outages of generators and transmission devices. In an unpredictable way, the system may collapse and separate into electrical islands. This is called unintentional system separation.

Because the formation of those islands is not in a designed manner, it is unavoidable to cause problems such as having (1) large imbalances between generation and load exist in some islands (Excessive load in a load-rich island has to be shed timely to prevent rapid frequency declines of generators while excessive generation has to be rejected in a generation-rich island. Consequently, large-area power outages may be caused by the unplanned island formation.); (2) some transmission lines being overloaded and then tripped—possibly resulting in more failures and further system separation within islands; and (3) the possibility of the generators that tend to lose synchronism in one island formed, making it difficult for them to cohere with each other spontaneously—which could lead to further outages of generators or transmission devices, and even worse, separation may continue in that island.

The above shows that unintentional system separation may not stop cascading failures. In contrast, it may worsen the situation and lead to large-area blackouts. For example, during the European blackout event on Nov. 4, 2006, one of the most severe and largest disturbances in Europe, the UCTE (Union for the Co-ordination of Transmission of Electricity) transmission grid spontaneously separated into three islands (West, North-East and South-East). The separation was caused by cascading line trips throughout the UCTE area. All the line trips were performed by local distance protections due to overloads. After the separation, significant power imbalances existed in islands: the Western and South-East islands are rich in load and the North-East island is rich in generation. The large power imbalance in the Western island induced a severe frequency drop and caused an interruption of supply for more than 15 million European households.

BRIEF SUMMARY OF THE INVENTION

These and other shortcomings of the prior art are addressed by the present invention, which provides a unified framework for solving the problems related to controlled system separation and developing controlled separation strategies.

According to one aspect of the invention, a phasor measurement units (PMU)-based controlled system separation method to protect against catastrophic blackouts includes the steps of performing an offline analysis of an electrical transmission network to partition generators into a number of coherent groups, performing online monitoring of the transmission network to determine a separation interface and frequencies and damping ratios of dominant inter-area modes, and performing real-time control to estimate the risk and timing of system separation.

According to another aspect of the invention, a phasor measurement units (PMU)-based controlled system separation method to protect against catastrophic blackouts includes the steps of partitioning generators into a number of coherent groups, monitoring the coherent groups to predict an out-of-step pattern, and determining a separation interface that matches the predicted out-of-step pattern. The method further includes the steps of calculating a risk of angle separation at the determined separation interface, comparing the calculated risk of angle separation to a pre-determined threshold, and tripping specified relays once the calculated risk of angle separation becomes greater than the pre-determined threshold to form islands.

According to another aspect of the invention, a phasor measurement units (PMU)-based controlled system separation method to protect against catastrophic blackouts includes the steps of performing an analysis of an electrical transmission network to partition generators into a number of coherent groups, positioning PMUs at terminals of main generators in each of the coherent groups to measure rotor angles and determine an average rotor angle of each of the coherent groups, and using the differences between average rotor angles to periodically determine a number of dominant inter-area oscillation modes between coherent groups, and their frequencies and damping ratios and predict out-of-step patterns. The method further including the steps of determining separation interfaces for dominant inter-area oscillation modes that match the predicted out-of-step patterns, positioning relays at the separation points to enable separation of a single coherent group from the number of coherent groups, calculating the risks of angle separation at the separation interfaces and comparing the calculated risks of angle separation to a pre-determined threshold, tripping specified relays at the separation interface where the calculated risk of angle separation is greater than the pre-determined threshold and blocking the relays where the calculated risk of angle separation is less than the pre-determined threshold to form islands, and performing load shedding or generation rejection strategies for each island formed to stabilize generators and arrest frequency declines.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
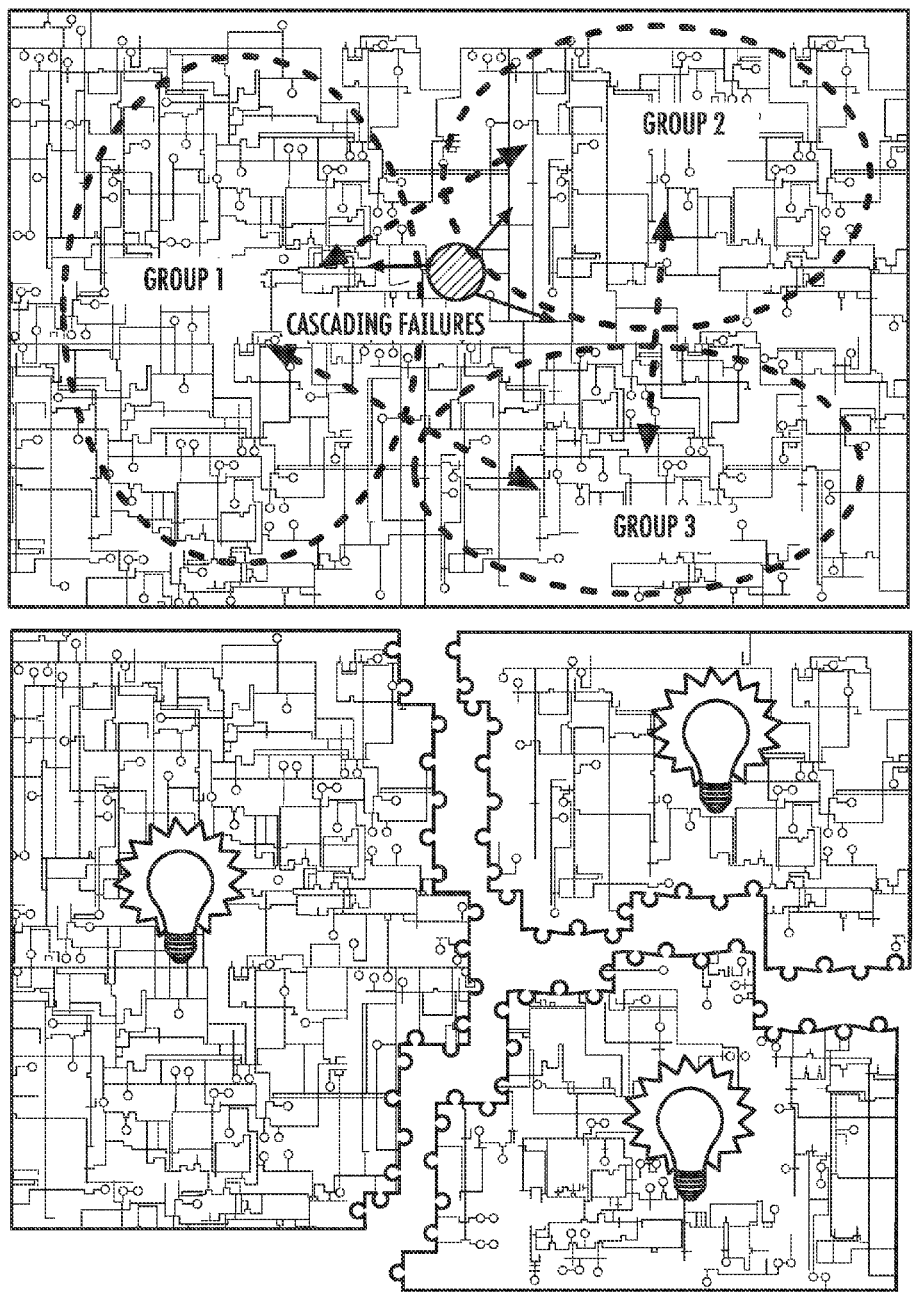
FIG. 1 shows a controlled system separation according to an embodiment of the invention.

Referring to the drawings, a PMU-Based controlled system separation scheme according to an embodiment of the invention is described below.

Existing separation schemes that fix separation points at pre-determined locations can be replaced by a more "intelligent" separation scheme in which separation points are adaptively optimized according to actual system conditions. PMU-based Wide Area Measurement Systems (WAMS) can gather and process the information needed for controlled system separation.

Controlled system separation (also called adaptive islanding) is considered the final line of defense to save a power transmission system against a catastrophic blackout under severe disturbances. In a controlled manner, the system is separated into sustainable electrical islands, which can be resynchronized later to restore the system.

When a power system cannot keep its integrity and might separate unintentionally, separating the system into islands in a controlled manner can effectively stop cascading failures and prevent the loss of a great amount of load and even a large-area blackout.

As depicted in FIG. 1, using controlled system separation performed at the correct time and at correct locations, electric power can continue to be supplied to local customers in each island formed, and the loss of load can be reduced to the minimum degree since generation-load balance is addressed. Since the islands are formed in such a designed manner, they also enable more prompt power system resynchronization and restoration.

The introduction of synchronized phasor measurement units (PMUs) in power systems enables the development of new applications for better online power system monitoring and control. PMUs make it possible to measure real-time phase angles at different locations. A wide-area measurement system (WAMS) with well-placed PMUs can measure voltage and current phasors in real time as useful system dynamic security information, by which system operators would be able to see a big picture of the system stability level. Those phasor measurements are precisely synchronized in time and taken at a high sampling rate (i.e. 30 samples per second). Equipped with advanced communication technologies, a WAMS offers dynamic visibility into the power system and enables finer and faster control of the network.

Existing PMU applications are mainly used in power system visualization and are based on PMU raw data. However, there is a need for applications assisting in power system analysis and control that can turn raw PMU measurements into more meaningful information and control strategies.

In order to effectively perform controlled system separation on a power system, three key technical issues need to be addressed. They are (1) where to separate and form islands, (2) when to separate, and (3) how to separate using hardware to implement separation and coordinate with other control strategies such as emergency load shedding strategies.

The three issues are not completely independent from each other. For some power systems, the three issues have to be studied together to find out the best solution. In addition, the three issues may be interpreted and prioritized differently for different power systems in order to focus main efforts on critical issues. For example, if a power system may potentially island a peninsular control area connected with the rest of the system by a few tie lines, the separation scheme deployed for that control area may focus on online determination of the time to open those tie lines and stabilize the island formed.

The issue of "where to separate" poses technical issues on the determination of separation points to form islands. For example, in the case of two-island separation, the interface between two islands is determined by a group of separation points; for the cases with more than two islands, separation points between two neighboring islands determine their separation interface.

An island formation strategy tells at what separation points or interfaces the system should be separated into islands. A feasible island formation strategy is expected to generate sustainable islands, which can operate independently as isolated power systems with minimum control. Basically, the dynamic and steady-state security criteria for the power system before separation also applies to the sub-system isolated in each island. Moreover, there could be multiple feasible island formation strategies for a power system.

If the optimal island formation strategy for a power system under different system conditions almost always opens the same group of lines to form islands, the power system may fix its separation points to minimize the use of separation hardware. This means that the issue "where" can be addressed offline and decoupled with the other two issues. Otherwise, separation points should be adaptively changed with the system condition to generate islands in the best way.

Figure 2:
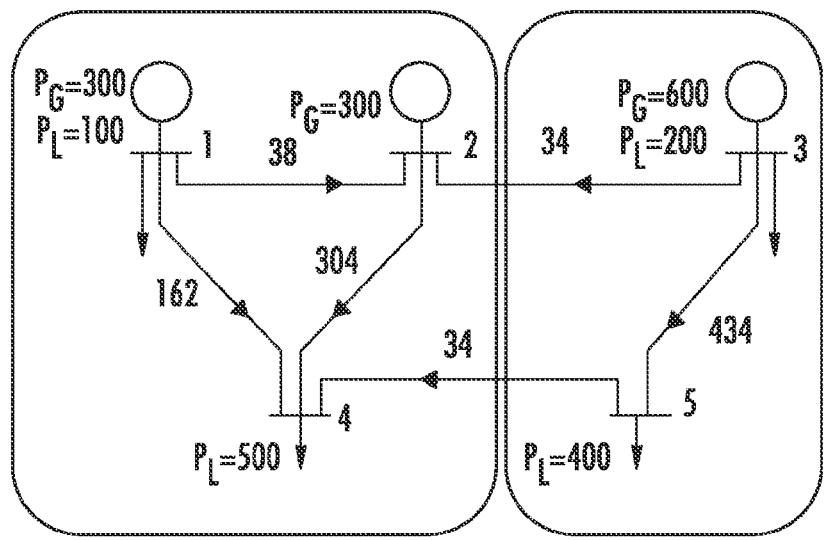
FIGS. 2 and 3 show two probable separation strategies of a five-bus power system.
Figure 3:
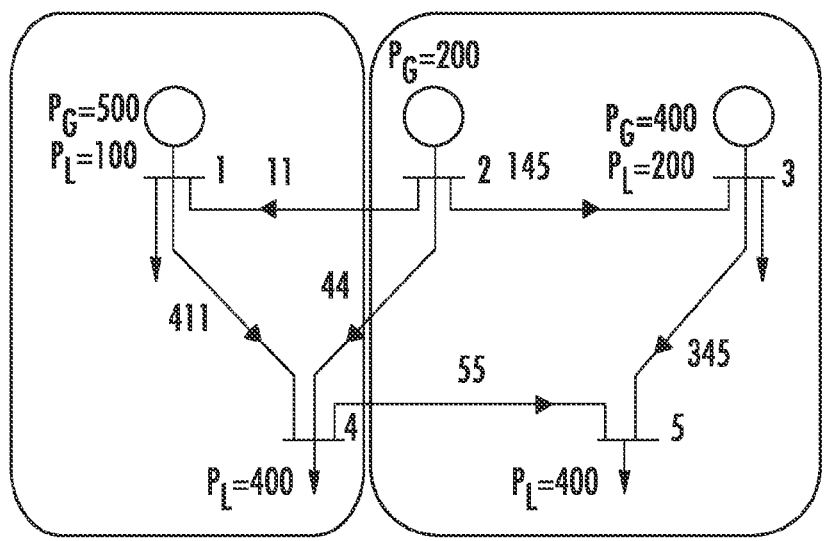

For example, a five-bus power system shown in FIGS. 2 and 3 is used to explain the advantages of adopting adaptive separation points. The unit of the numbers is MW. Assume that, under the system condition depicted in FIG. 2, the system may lose synchronism to form two groups of generators: (1) generators 1 and 2, and (2) generator 3. The optimal separation interface to form two islands comprises of lines 2-3 and 4-5. The overall power interchange via that interface is zero. However, under another system condition shown in FIG. 3, power flows are significantly changed and generator 2 tends to be more coherent with generator 3. The overall power interchange via that separation interface becomes 145+55=200 MW. Thus, opening lines 2-3 and 4-5 will not be a good option since generators 1 and 2 in the left island may not be stable, and the right island has to shed excessive load of 200 MW. In fact, under the second system condition, the optimal strategy is to open lines 1-2, 2-4 and 4-5, which can generate two balanced islands as shown in FIG. 3.

When separation points are compared and selected, the following basic constraints should be considered in order to ensure forming sustainable islands. The first two constraints are steady-state constraints, and the third constraint is a dynamic constraint.

Power Balance Constraint: This constraint ensures that the supply and demand in every formed island are approximately equal, i.e. balanced, and sets a small threshold for the imbalances of all islands. If a group of separation points can generate islands whose power imbalances are below that threshold, that island formation strategy will be acceptable. Here, "power balance" is mainly in terms of real power, under the assumption that reactive power can be balanced locally by compensation devices to maintain voltages at acceptable levels. The imbalance threshold may be determined according to post-separation frequency criteria and frequency regulation capabilities of planned islands.

Transmission Capacity Constraint: This constraint prevents the overloading of transmission lines in each island, thereby avoiding further line outages due to overloads after controlled system separation. Since system separation opens a number of lines to form islands, power flows in those lines will be redirected to other existing lines within the islands. Controlled system separation may be performed at strategically selected separation points and coordinates with other protection and control actions to prevent violating the transmission capability constraint.

Dynamic Performance Constraint: This constraint concerns the dynamic performance of controlled system separation to avoid further instability after system separation to the minimum degree and ensures that the generators in each island are stable either spontaneously or with the aid of moderate control.

After the above three constraints are introduced, issue "where" can be reinterpreted as searching for separation points satisfying the constraints. The complexity of the problem depends on (1) whether the power system is topologically complex and (2) whether given constraints can be verified within available time.

A power system may have control areas connected by tie lines. To island a control area with matched generation, the tie lines connected with it are potential separation points. For a control area without sufficient generation (e.g. a load center area), separation points can be moved into the area to relieve some load burdens to neighboring areas rich in generation.

For a certain set of separation points, steady-state constraints, can easily be checked by power flow calculation in each anticipant island. However, the verification of the dynamic performance constraint requires time-domain simulations on system separation. If simulations are performed for all possible island formation strategies, the computational burden would be huge. Thus, verification process is partitioned into three steps: (1) identify the patterns of generator grouping under disturbances, i.e. what generators are more likely to be coherent, and come up with several generator groups, (2) limit the candidates for island formation strategies to those not breaking the connection of each identified generator group, and (3) simulate every island formation strategy for the stabilities of the islands formed, or design additional control actions that help stabilize each island.

Each generator group identified by the first step is called a coherent generator group. The approach is based on an assumption that those generators cohering with each other also easily keep their synchronism after being separated into one island. Based on the above approach, the procedure of solving issue "where" can be partitioned into multiple stages with different time frames to reduce online computational burdens.

There are two types of technologies for identification of generator grouping—structure-based and trajectory-based methods. Structure-based methods focus on identifying the weakest connections in a power network, and trajectory-based methods focus on analyzing oscillation modes of dynamic trajectories.

Figure 4:
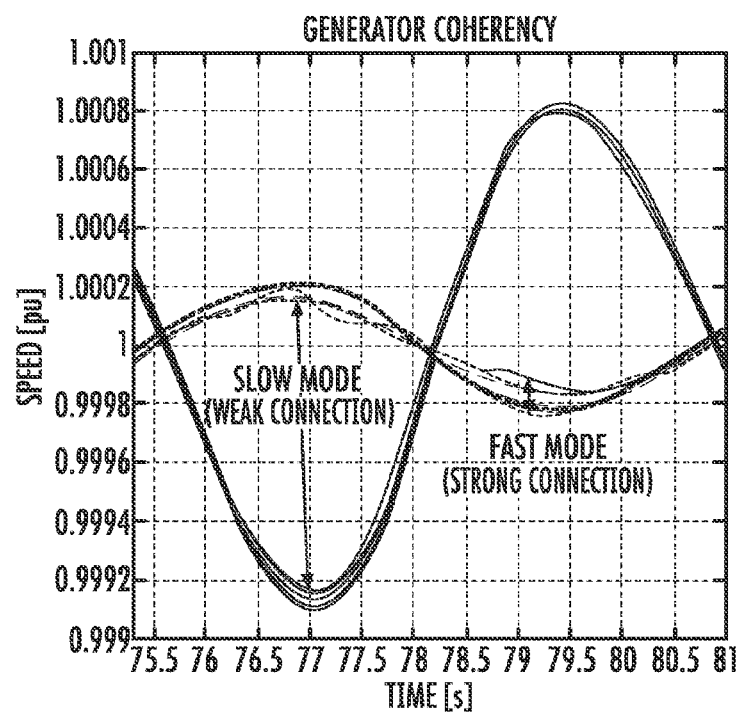
FIG. 4 shows oscillation modes of generators.

A representative structure-based method is the slow coherency method which is an application of the singular perturbation or two-time-scale method in power systems. In a multiple-generator power system, the links, either topological or electrical, between some generators are comparatively weak. Thus, when generators are oscillating due to a disturbance, those with stronger connections tend to be coherent to form groups. It can be observed that there are fast oscillations in each group and slow oscillations between groups as shown in FIG. 4.

Those slow oscillation modes indicate the weak links between generators. In order to understand possible patterns of generator grouping, this method is to identify the weak links in the system, which correspond to slow oscillation modes. The method is based on two observations that (1) the coherent groups of generators are almost independent of the size of the disturbance, so that the linearized model of the system can be used to determine the coherency and (2) the coherent groups are generally independent of the level of detail used in modeling generators, so that the classical generator model can be used.

Figure 5:
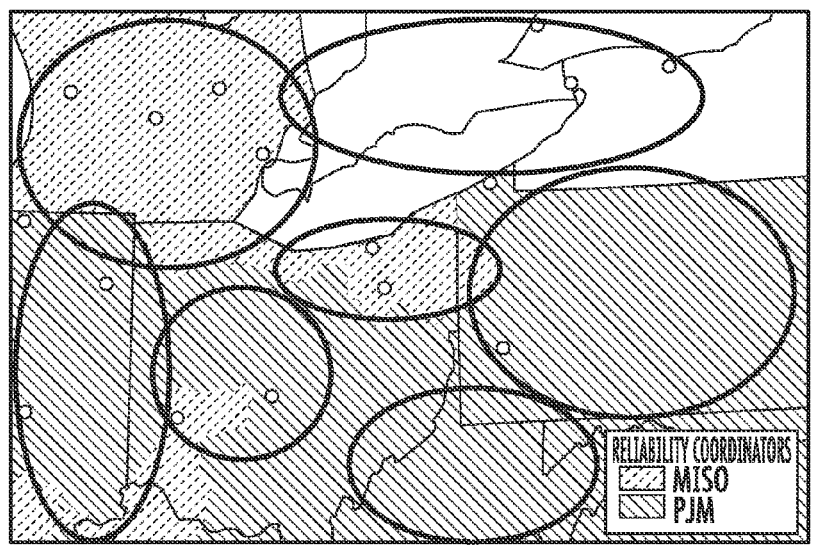
FIG. 5 shows coherent generator groups in a region of the Eastern Interconnection.

A dynamic reduction program can effectively solve coherent groups of generators for large-scale power systems. For example, as shown in FIG. 5, a dynamic reduction program identified coherent generator groups in a region of the Eastern Interconnection.

A trajectory-based method basically (1) obtains trajectories of generator rotor angles or speeds by, e.g., PMUs and (2) performs modal analysis (e.g. by Fourier or Wavelet Transform) to identify the dominant oscillation mode as well as the generators involved, and hence determine the grouping pattern of generators. By using this method for main generators of a power system, the dominant inter-area mode of the whole system can be indentified. Then the generator grouping pattern can be determined.

After the pattern of generator grouping is identified, the next step is to solve the separation points separating potentially out-of-step groups into islands and satisfying given constraints. This step needs to first simplify the network of the power system, and then determines how to partition the network.

Once the separation points have been determined for controlled system separation, the issue of "when" may be determined. Selection of the correct timing to separate the system is crucial. Controlled system separation should be performed when generators are going to lose synchronism to result in angularly separating groups such that unintentional system separation is unavoidable.

Prediction or detection of generator out-of-step (i.e. loss of synchronism) can help determine the separation timing. Traditionally, out-of-step (OOS) blocking and tripping relays designed based on distance replays are adopted to detect loss of synchronism and separate a power system at fixed points.

The settings of OOS tripping and blocking relays are based on a large number of contingency cases (simulations) which may lead to transient instability.

However, even if the out-of-step tripping strategy is well designed and appropriately set, it still has a number of disadvantages in minimizing the effects of the disturbance and may misoperate when the prevailing conditions have not been foreseen during the design phase. A key problem of traditional out-of-step protection strategies is that they are only designed based on local measurements and are not coordinated well at the system level. Therefore, they are good at protecting individual generators and performing controlled system separation at fixed separation points, but are not recommended for a controlled system separation scheme adopting adaptive separation points.

A WAMS with PMUs installed at multiple locations can provide real-time synchronized measurement data, especially post-fault data, to present a global picture about system synchronization, so it can determine the moment when out-of-step occurs.

A direct idea is to check whether the angular difference (or its rate of change) between two groups of generators exceeds a threshold pre-determined through offline studies. For example, the autoregressive model (AR) may be used to represent the oscillations of phase differences of bus voltages between substations, and confirm the occurrence of out-of-step once the sign of the real part of the characteristic roots becomes negative. Intelligent technologies, Artificial Neural Network, and Fuzzy Theory, can be applied in detecting loss of synchronism.

For a practical system separation scheme, early and accurate detection of the need for controlled system separation is important. If controlled system separation is performed after the system has severely lost stability, a big effort will be required to stabilize the islands formed. In fact, high rate measurements from PMUs enable early detection of the need for controlled system separation. Thus, controlled system separation can be performed proactively. The technique described below uses online estimates of the risk of angle separation using real-time PMU data, and once that risk exceeds a preset limit, e.g. 90% or 95%, it will be the time to perform controlled system separation at the separation points already determined. The separation time determined by that technique is generally earlier than the actual loss-of-synchronism time, which enables early detection and provides time margin for communication and execution.

With the issues of "where" and "when" determined, the issue of "how to separate" becomes important. The hardware opening the lines at the separation points is crucial for the success of controlled system separation. As mentioned above, out-of-step blocking and tripping relays are traditionally the devices used to perform system separation at fixed separation points according to their local measurements.

For an adaptive system separation scheme, special separation relays (SSR) need to be used to enable coordination at the system level by the control center. Redundant SSRs may be installed at potential separation points to enable adaptive selection among them. The SSRs placed at branches (potential separation points) should have the following functions:

Tripping: opening the branches once receiving a tripping signal from the control center.

Blocking: before receiving a tripping signal, disabling all undesired trips including those either not at the right separation points or at the right separation points but not at the right time.

A separation algorithm may also be deployed at the control center to coordinate all SSRs and make sure that the branches at the determined separation points are opened at the exact same time in order to form desired islands.

After islands are formed, additional control may be required to stabilize generators of each island and maintain frequencies and voltages to acceptable levels. Basically, utilities may have load shedding or generation rejection strategies. For example, Under-Frequency Load Shedding (UFLS) strategies are used by some utilities for emergency control. Loads at certain buses can be shed by under-frequency relays in several stages depending on the frequency drop.

In order to more effectively stabilize the islands formed after system separation, load shedding and generation rejection strategies need to be coordinated with the action of separation. For example, load shedding can immediately be performed once an island with excessive load is formed, without need to wait until a frequency decline is detected. For each potential island, the load shedding or generation rejection strategy can be customized according to offline simulation studies.

In a PMU-based three stage scheme, each SSR is placed at a potential separation point and may be tripped or blocked by the control center through high-speed and reliable communication channels. PMUs may help coordinate all SSRs in the system.

The inventive scheme uses the following three stages: (1) Offline Analysis, (2) Online Monitoring, and (3) Real-Time Control.

In the offline analysis stage, the following tasks are performed whenever the system's network topology is changed (e.g. adding new generation or transmission infrastructures).

Partition generators into a number of coherent groups defined as Basic Coherent Groups (BCGs). The partition criterion may be that generators of each group are coherent at a high probability under a wide range of system conditions. PMUs can strategically be placed to monitor the oscillations of those BCGs and predict their angle separation.

According to the BCGs and typical operating conditions, determine potential separation points to place SSRs, which are able to separate any single BCG with matched load (the difference is either minimized or less than a preset threshold). Other given constraints, e.g., avoiding transmission line overloads after separation may also be considered in placing SSRs.

Develop the load shedding and generation rejection strategies for each potential island.

The objective of the offline analysis stage is to identify potential out-of-step patterns. Accordingly, PMUs and SSRs can be placed and then additional control strategies after separation can be prepared for online use.

System planners may partition generators into Basic Coherent Groups (BCGs) according to their coherency under disturbances. Any way to partition those BCGs indicates a potential out-of-step pattern of the system. System planners may study the placement of PMUs and SSRs. Since PMUs are responsible for monitoring oscillations between coherent groups of generators in order to predict angle separation, they may be placed within each BCG (e.g. close to main generators) to directly monitor the angular difference between two BCGs. For the placement of SSRs, because there is a probability that a single BCG loses synchronism with the others, it is recommended that the placement of SSRs should enable isolating every single BCG with matched load.

Figure 6:
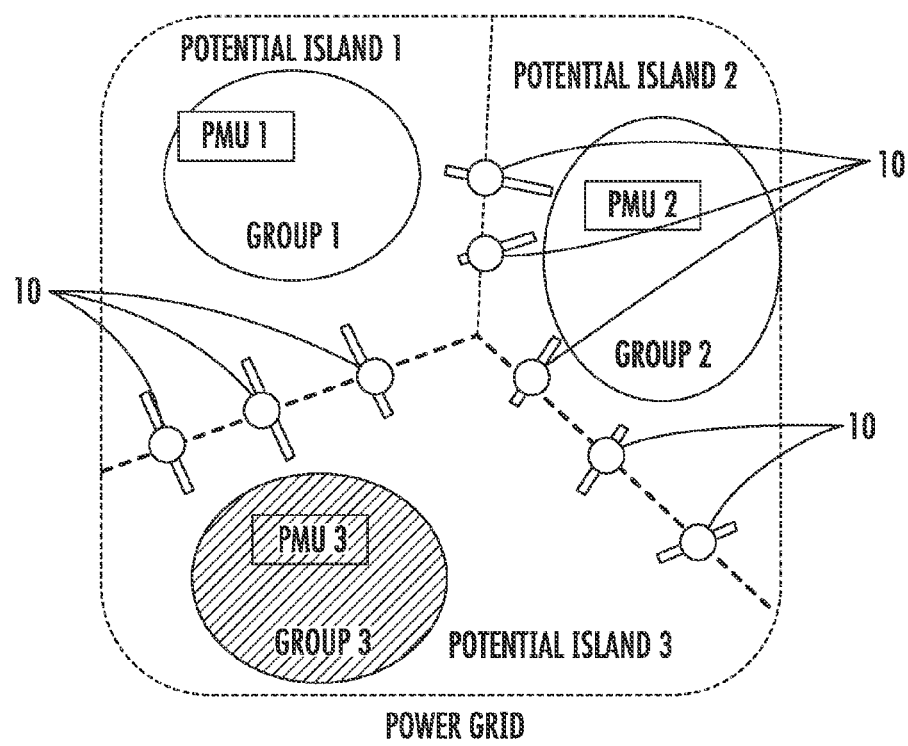
FIG. 6 shows placement of PMUs and relays according to an embodiment of the invention.

For a power grid shown in FIG. 6 assume that it may spontaneously form three coherent generator groups under disturbances. Connections between the three groups of generators are relatively weak compared with the connections within each group. Thus, the three groups are regarded as Basic Coherent Groups (BCGs). For this system, at least three PMUs need to be placed respectively in three BCGs. There are four potential out-of-step patterns:

Group 1 ties with Group 2 against Group 3 (to form two islands)

Group 1 ties with Group 3 against Group 2 (to form two islands)

Group 2 ties with Group 3 against Group 1 (to form two islands)

Groups 1, 2 and 3 all go out of step (to form three islands)

The worst case is that all three BCGs become out of step, so the placement of SSRs should be able to isolate every single BCG as indicated by dots 10 and shown in FIG. 6.

For every potential out-of-step pattern, the load shedding and generation rejection strategies associated with controlled system separation also need to be studied offline. Load shedding or generation rejection may be performed immediately after system separation to quickly stabilize generators and arrest frequency excursions. The actual amount of load to shed or generation to reject in an island may not exactly equal its generation-load imbalance, and may be determined by offline simulation studies.

Two key techniques, identification of coherent generator groups and determination of potential separation points, are discussed below.

A slow-coherency method may be used to solve coherent groups of generators as references for determining BCGs. The following algorithm based on the slow-coherency method can determine the optimal strategy that partitions all generators (say n) of a power system into groups of a given number r according to their coherency.

Use an n-th order linear dynamic system $\dot{x}=Ax$ with $x(0)=x_0$ to represent the power system's linearized model. The classical model is used for each generator.

Find the slowest r modes by eigenvalue analysis on state matrix A. The corresponding r eigenvalues $\lambda_1 \sim \lambda_r$ indicate r reference generators of the r groups to be determined. Accordingly, PMUs could be placed close to those reference generators.

Determine the r-group partitioning by comparing the Euclidean distances between the rows of eigen-basis matrix V satisfying $AV=V\Lambda$, where $\Lambda=\text{diag}(\lambda_1, \ldots, \lambda_r)$.

The coherent groups may further be verified by simulation studies on widely selected contingencies. If it is found that the probability of two coherent generator groups going out of step is negligible, they may be combined to form one BCG.

Figure 7:
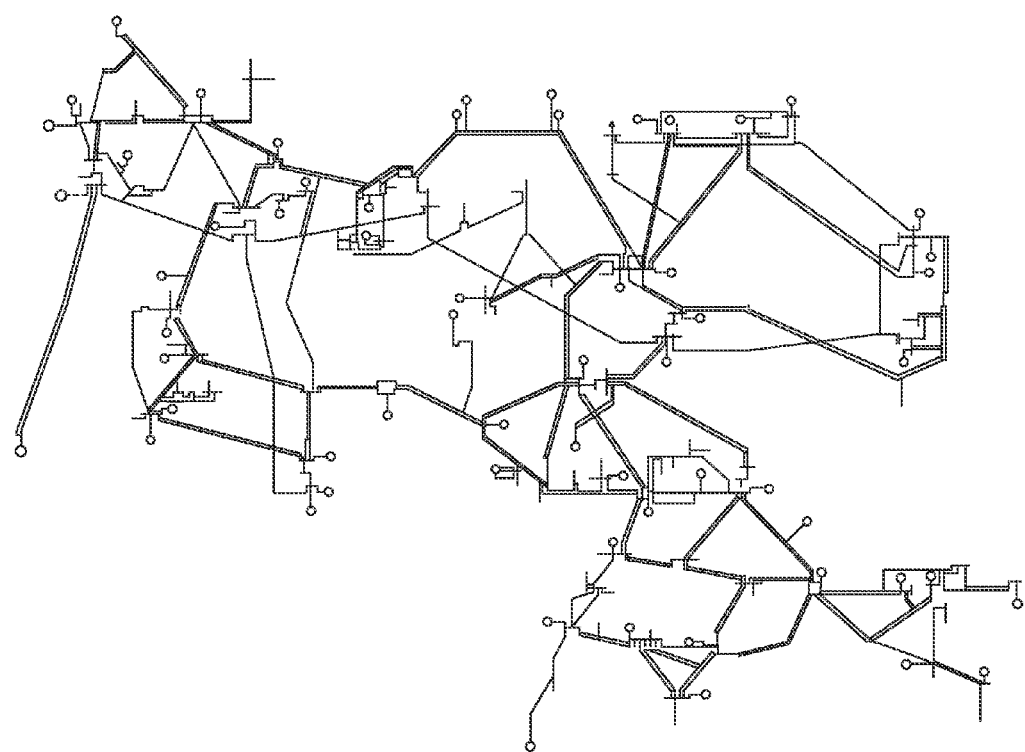
FIG. 7 shows a 118-bus power system.

To identify at which specific buses SSRs should be placed around one BCG, system planners may assign appropriate load buses to match its total generation. For a complex power network, a procedure for determination of potential separation points (namely, locations of SSRs) is given in Table 1, which also illustrates the procedure using the IEEE 118-bus power system shown in FIG. 7. "Splitting Strategies for Islanding Operation of Large-scale Power Systems Using OBDD-based Methods" by K. Sun, D. Zheng, Q. Lu provides some graph theory-based measures to simplify a power network and a heuristic searching algorithm to fast optimize separation points. Those techniques may be used in steps 4 and 5 of the above procedure.

TABLE 1

Figure 8A:
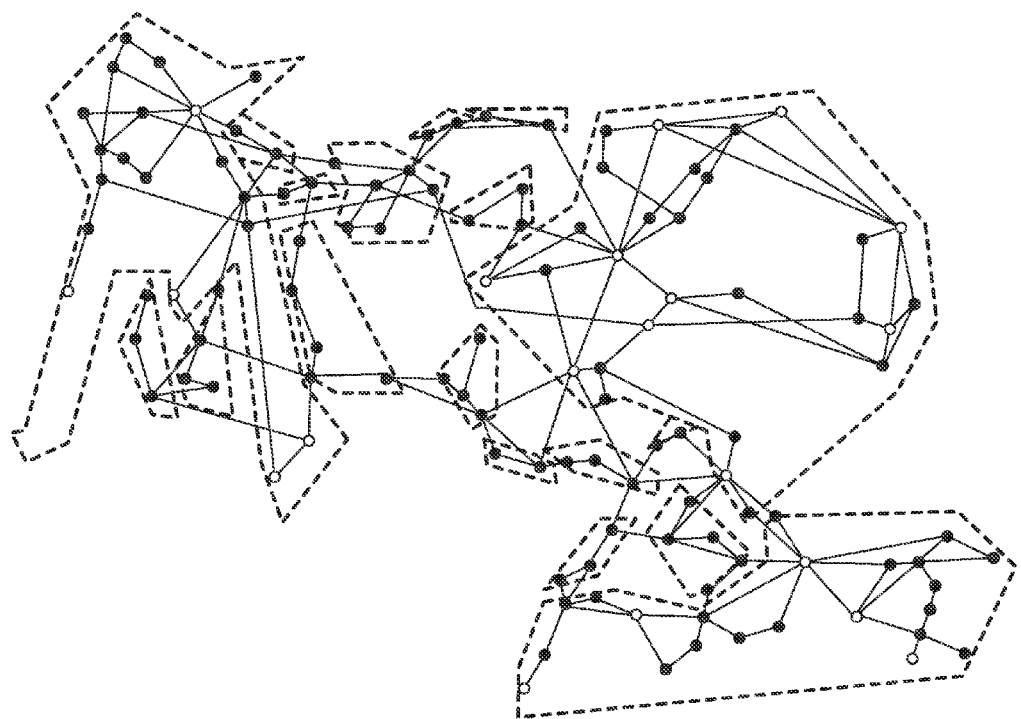
FIG. 8A-8C show a simplification of a 118-bus power system by graph theory.
Figure 8B:
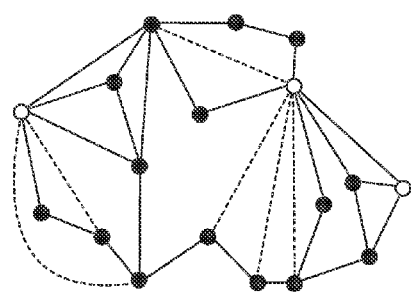

| Steps | Tasks | Tasks on the IEEE 118-bus power system |
|---|---|---|
| 1 | Represent the power system using a graph model with generator nodes (generator buses) and load nodes (the other buses) connected by lines (transmission lines and transformers). | As shown in FIG. 8A, generator and load nodes are respectively white and black dots |
| 2 | Merge the area containing each BCG and the load nodes that help connect its generator nodes into an equivalent generator node. This means that SSRs do not need to be placed in that area. The power output of this equivalent generator node equals the total generation minus the total load of that area. | Assume that the system has three BCGs: the first BCG contains generators 10, 12, 25, 26 and 31, the second BCG contains generators 87, 89, 100, 103 and 111, and the other generators compose the third BCG. As shown in FIG. 8B, the three big areas covering the three BCGs can be regarded as three equivalent generator nodes. |
| 3 | Also simplify load nodes: if there is no need to the load nodes in an area, that area can be regarded as an equivalent load node. This means that | In FIG. 8B, if it is expected that the load nodes in each small area stay together after system separation. Thus, those areas are |

TABLE 1-continued

Figure 8C:
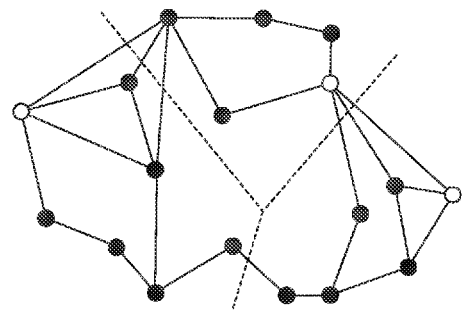
Figure 9:
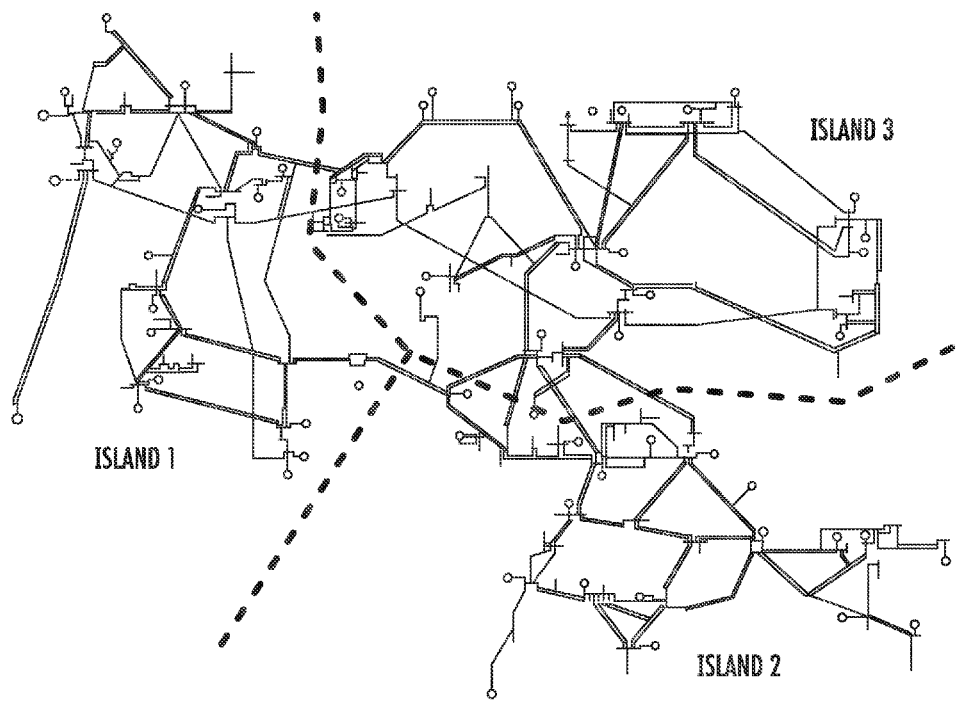
FIG. 9 shows an island formation strategy for a 118-bus power system.

| Steps | Tasks | Tasks on the IEEE 118-bus power system |
|---|---|---|
| | SSRs do not need to be placed in that area. | regarded as equivalent load nodes. As a result, a simplified graph is generated as shown in FIG. 8B. |
| 4 | Further simplify the formed graph by graph theory. | The graph in FIG. 8B can further be simplified by removing redundant lines, which are not independent in determining separation points according to graph theory. Then, a simpler graph is given in FIG. 8C. |
| 5 | Select the separation points in the simplified graph to separate all equivalent generator nodes. The selection should consider the power balance constraint and transmission capacity constraint mentioned above. From the determined separation points, the locations to place SSRs in the original power network can be concluded. | For FIG. 8C, it is easy to solve the optimal strategy separating three BCGs, from which potential separation points in the original power system can be concluded as illustrated by the broken lines in FIG. 9. |

In the online monitoring stage, the following tasks are repeatedly performed every several seconds (e.g. 1~5 seconds) on PMU data over a past time window T (e.g. 10~40 seconds, which should be longer than double time periods of any probable inter-area oscillation mode in the system), to online track the system's status.

Monitor what BCGs are coherent at the current operating point using PMU data. Accordingly, the most probable out-of-step pattern is predicted.

Determine the separation interface (i.e. a set of separation points) that matches the predicted out-of-step pattern and minimize the generation-load imbalance in each formed island according the current operating point.

Figure 10:
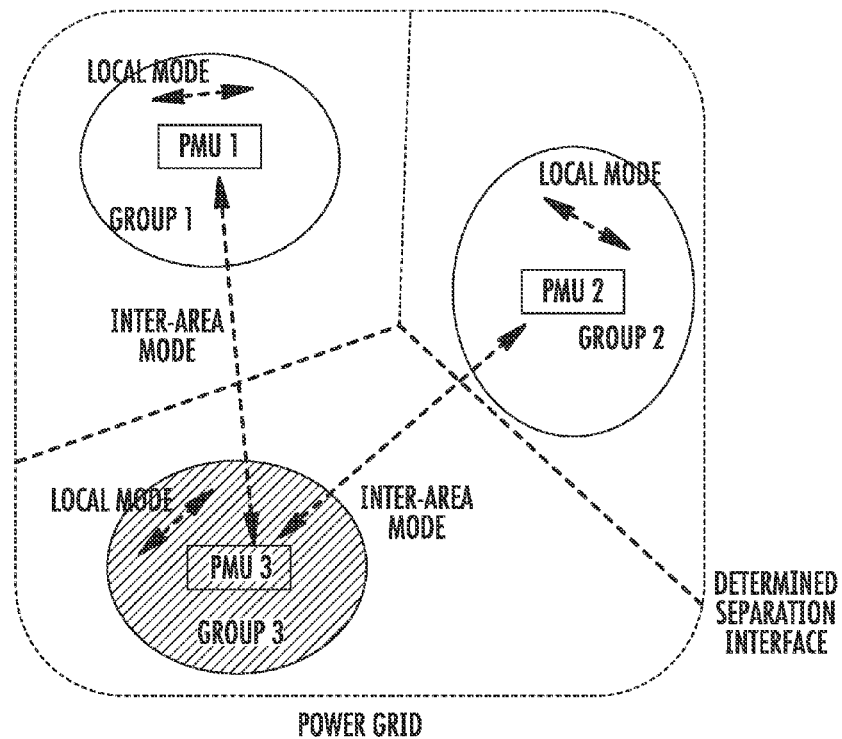
FIG. 10 shows a determination of a separation interface according to an embodiment of the invention.

The aforementioned slow-coherency method in the offline analysis stage is used to partition all generators into BCGs. As shown in FIG. 6, three BCGs were determined in the offline analysis stage, which indicate the worst case of loss of synchronism. However, at a specific operating point, the actual pattern of generator grouping may be that some BCGs determined offline are more tightly connected together to become one coherent group against the others. FIG. 10 illustrates this situation where Group 1 and Group 2 become a joint coherent group and swing together against Group 3. It is important to emphasize that the pattern of generator grouping can change as the system's operating condition changes due to, e.g., system disturbances, function of protective devices, and resulting network reconfiguration (or topological changes). Therefore, the objective in the online monitoring stage is to continuously recognize the pattern of generator grouping, i.e., how predetermined BCGs group under the current operating condition. That directly indicates the most probable out-of-step pattern if the out-of-step condition really occurs. Accordingly, the most probable separation interface, i.e., a set of SSRs to trip, can be predicted for the real-time control stage, as illustrated in FIG. 10.

Thus, in the online monitoring stage, an automatic procedure is used to recognize the current generator grouping pattern in the time frame of a few seconds. Time-synchronized and high-sampled PMU measurements enable the monitoring of all oscillation modes in the system. The online monitoring stage should be continuously performed in order to timely update the prediction on the out-of-step pattern. The proposed procedure in this stage utilizes advanced signal processing techniques for estimating modal properties from PMU data.

Analysis on the following modal properties of each oscillation mode helps determine the current generator grouping pattern:

Frequency and damping: indicating potentially dangerous oscillation modes, which are either dominant in size or low-damped.

Mode shape: indicating whether an oscillation mode is a local mode (involving very few generators) or an inter-area mode (between BCGs) and what BCGs swing together or against each other at this mode.

It should be pointed out, analysis on these modal prosperities in the online monitoring stage is not necessarily based on the BCGs determined by slow-coherency method in the offline analysis stage. In fact, the procedure adopted in the online monitoring stage only requires PMU measurements and can be applied independently from system models. However, the introduction of BCGs in the offline analysis stage enables the procedure in the online monitoring stage to more reliably and effectively predict the most probable separation interface.

Computational efficiency and accuracy are also important for the online monitoring stage of the proposed controlled system separation scheme. Thus, an effective but accurate power system damping estimation method based on analytic wavelet transform (AWT) is proposed.

The inventive method assumes that the system transfer function can be decomposed into a sum of prototype quadratic transfer functions which effectively represent system oscillation modes in practice. In essence, this is the same assumption on which Prony Analysis method and other popular super-resolution based harmonic analysis tools were developed. However, the inventive method only focuses on the modes of interest and thus avoids unnecessary computational burden in determining all modes including spurious harmonics that are considered to be drawbacks of those Prony-like analysis techniques. Note that the analytic wavelet transform-based method is also effective in identifying the modal properties of nonlinear systems, for which time-varying estimates of frequencies and damping are truly required, because the method allows time-frequency analysis of measured data. AWT provides good time resolution at high dilations (low frequencies) but good high frequency resolution sacrifices its time resolution due to the Heisenberg uncertainty principle.

When generators in a power system oscillate under disturbances, oscillation modes can be detected from PMU measurements about various systems variables such as power flows, voltage magnitudes, phase angles, and angular differences between generators or groups of generators. Based on AWT, a method for estimating dominant modal frequencies and damping information from the continuous dynamic signal about one system variable is provided below. The signal may be represented as a sum of N damped sinusoidal functions:

$$v(t) = \sum_{i=1}^{N} \alpha_i e^{-\zeta_i \omega_{ni} t} \cos(\omega_{di} t + \phi_i).$$

Notice that this is a very general assumption made in most of the techniques addressed to identify system oscillation modes. The method has the following steps:

Calculate the AWT of a single-mode signal:

The AWT of a single-mode signal $v(t)=\alpha e^{-\zeta\omega_n t}\cos(\omega_d t+\phi)=a(t)\cos\theta(t)$ is:

$$Wv(u,s) = \tfrac{1}{2}a(u)\hat{\psi}_{u,s}(\omega(u),\sigma,\eta)e^{j\psi(u)}$$

where $$\hat{\psi}_{u,s}(\omega(u),\sigma,\eta) = (4\sigma^2 s^2 \pi)^{\frac{1}{4}} \exp\left(\frac{-\left(\omega-\frac{\eta}{s}\right)^2 \sigma^2 s^2}{2}\right)\exp(-j\omega u)$$

Perform FFT on the signal and determine its modal frequency $\omega_d$:

Note that, for $\omega = \eta/s = (\omega_d)$, the exponential term of $\hat{\psi}_{u,s}(\omega(u),\sigma,\eta)$ becomes 1, i.e. the peak value. For the signal with multiple modes, K dominant modes can be automatically selected from the top-K peaks. Then, damping parameters of those dominant modes can be estimated.

Take a logarithm for the absolute AWT and obtain the following relationship:

$$\ln\left(\frac{2|Wv(u,s)|}{(4\sigma^2 s(u)^2 \pi)^{\frac{1}{4}}}\right) \approx -\zeta\omega_d u + \ln\alpha$$

Perform a linear regression and obtain the damping coefficient for the chosen $\omega_d$:

Note that due to the linearity property, the above procedure can be applied to all selected modes. Experiments show that the inventive AWT-based method takes less than ⅓ of the computation time spent by Prony analysis method, so it is computationally more efficient, and could be embedded into an online application as part of the proposed controlled system separation scheme. However, Prony analysis method may be used as an alternative to the AWT-based method if its computation time and accuracy are not issues in implementation. The estimated damping ratios could be compared with preset threshold values to help system operators online beware of low-damped or growing oscillations. The damping ratios may also be utilized in the real-time control stage to help determine the separation time.

A numerical example is provided below. Assume that the following signal $\Delta\delta(t)$ is a synthetic angular difference between the average angles of two areas measured by PMUs strategically located.

$$\Delta\delta(t) = \delta_{dc}(t) + \sum_{i=1}^{N} A_i e^{-\zeta_i \omega_{ni} t}\cos(\omega_{di} t + \varphi_i),$$

$$\omega_{di} = \sqrt{1-\zeta_i^2}\,\omega_{ni}$$

Figure 11:
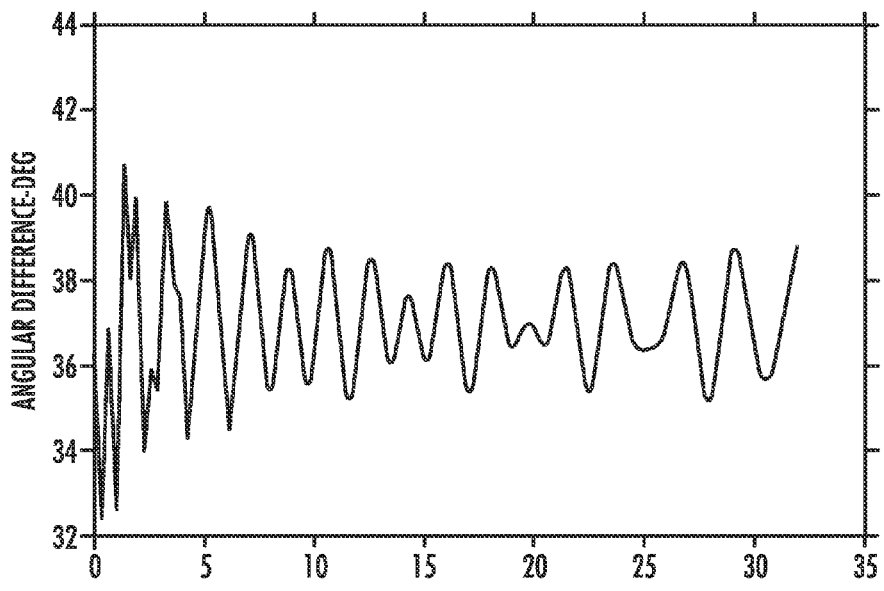
FIG. 11 shows an oscillatory component of a synthetic angular difference.

Its parameters are arbitrarily assumed as follows to generate an example signal as shown in FIG. 11.

$\delta_{dc} = 37°$, $N=3$, $A_{1,2,3}=4.1,3.1,0.3$ $\zeta_{1,2,3}=0.05,0.02,-0.03$, and $\omega_{d1,d2,d3}=2\pi(1.54,0.55,0.37)$.

The method above will be tested to see whether damping ratios $\zeta_{1,2,3}$ and angular frequencies $\omega_{d1,d2,d3}$ can accurately be estimated.

Figure 12:
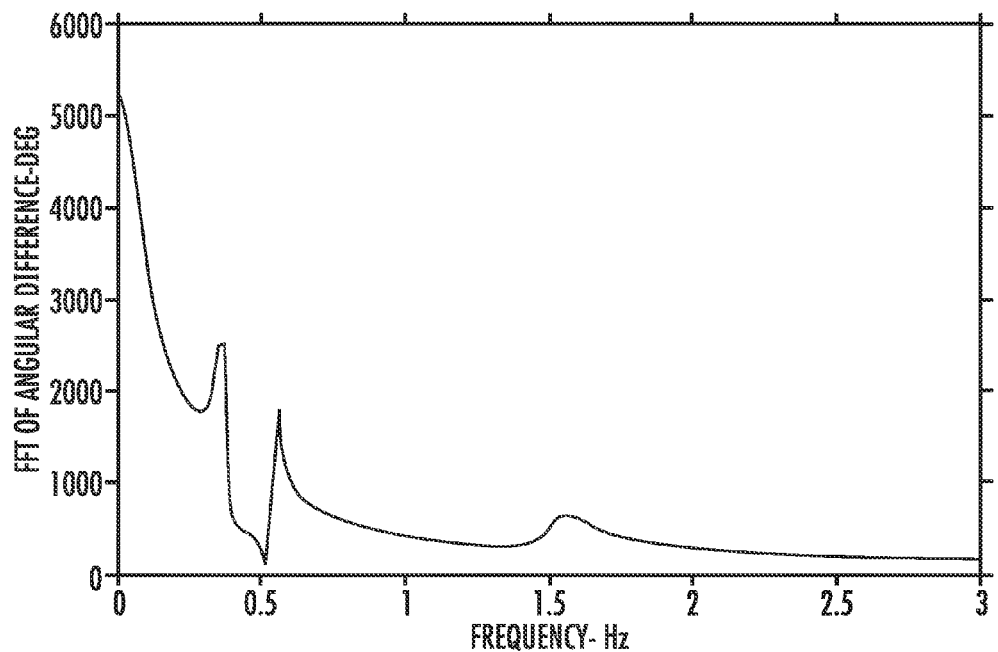
FIG. 12 shows an FFT result of the angular difference.

If the dc component of $\Delta\delta(t)$ monotonically increases toward a threshold value, it directly indicates an out-of-step condition. This signal is not the case, so just filter out the dc component. The FFT result is shown in FIG. 12, where three peaks indicate three dominant oscillation modes. Their frequencies may be estimated from the FFT result as 0.37, 0.55, and 1.54 Hz, which match the parameters of the signal.

Figure 13:
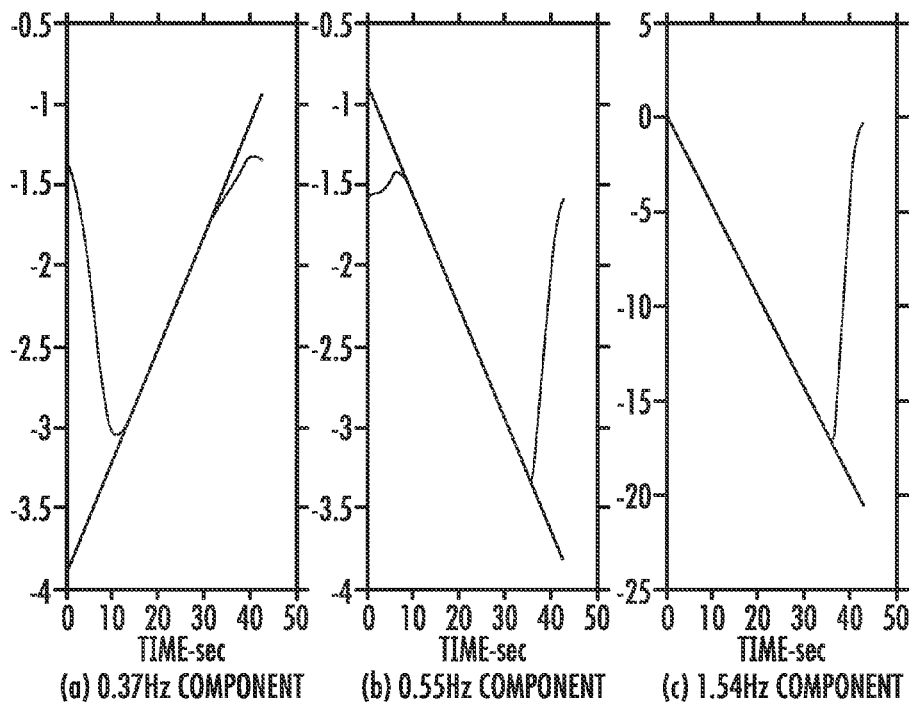
FIG. 13 shows linear regression analysis on a logarithm of the absolute AWT.

The AWT-based damping estimation technique is applied to the signal in FIG. 11. As shown in FIG. 13, linear regression analysis can estimate the slope of each oscillation mode, i.e. $-\zeta\omega_d$. Using $\omega_d$ obtained from the spectral analysis of the signal, the damping ratios are solved as $\zeta_{1,2,3}=0.049, 0.020$, and $-0.032$, which are accurate.

After the frequency and damping ratio of each dominant oscillation mode is estimated, its mode shape can be identified to confirm how BCGs may potentially separate at that mode. Identification of dominant oscillation modes only tell which oscillation modes perhaps evolve into angle separation under further disturbances but mode shape analysis is focused on whether two BCGs swing together or against each other at a dominant mode. Thus, after comprehensively analyzing the relationship of each pair of BCGs, we may draw a big picture of the mode shape, i.e., where is the most probable interface of angle separation.

Spectral analysis technology is used in mode shape analysis to predict the most probable separation interface. Spectral analysis consists of three primary calculations: power spectral density (PSD) or auto spectrum, cross-spectral density (CSD) or cross spectrum, and coherency analysis. Each of these calculations provides frequency dependent information on the mode properties. The PSD and coherency analysis provide information on modal frequency and participation. The CSD provides information on the mode shape.

Consider two signals $y_1(t)$ and $y_2(t)$ measured by PMUs. For example, they could respectively be the average phase angles of two BCGs, say BCG 1 and BCG 2. The PSD for each signal over a long enough time window T is defined as follows:

$$S_{11}(\omega)=E\{Y_1(\omega)Y_1^*(\omega)\}/T$$

$$S_{22}(\omega)=E\{Y_2(\omega)Y_2^*(\omega)\}/T$$

where $E\{\}$ is the "expectation" operation (or average): $Y_1(\omega)$ and $Y_2(\omega)$ are the Fourier transform of $y_1(t)$ and $y_2(t)$ at frequency $\omega$, and $Y_1^*(\omega)$ and $Y_2^*(\omega)$ are the complex conjugates of $Y_1(\omega)$ and $Y_2(\omega)$. Note that expectation operation is used because all signals are considered random. Then, the Fourier transformed signals are also random. The expectation operation allows us to examine the "average" or expected effect, presenting large peaks at the modal frequencies. The CSD between $y_1(t)$ and $y_2(t)$ is defined as follows:

$$S_{12}(\omega)=E\{Y_1(\omega)Y_2^*(\omega)\}/T.$$

Once both $y_1(t)$ and $y_2(t)$ participate in a given mode, the phase angle of $S_{12}(\omega)$ at the mode frequency provides the phase information between BCG 1 and BCG 2. For example, say both $y_1(t)$ and $y_2(t)$ participate in a mode at frequency w. If the phase angle of $S_{12}(\omega)$, i.e., $\angle S_{12}(\omega)$, is around $\pm 180°$, BCG 1 swings against BCG 2 at that frequency. If the phase angle is around $0°$, BCG 1 and BCG 2 swing with each other at that frequency. Values not close to $0°$ or $\pm 180°$ represent a transitional point in the changing of mode shape.

It is important to note that the aforementioned angular information is meaningful only when both signals participate in the same mode due to the same physical reason. It is not uncommon that both signals have a peak at a certain frequency, $\omega$ but, they do not participate in the same mode. This indicates that there are two separate modes near ω, which especially occurs for local modes. The following linear coherency-squared function provides the information to distinguish between two separate modes (local modes) or one common mode (inter-area mode).

$$\gamma^2(\omega) = \frac{|S_{12}(\omega)|^2}{S_{11}(\omega)S_{22}(\omega)}$$

The estimated coherency between two signals, in particular, has long been taken as a heuristic indicator for the frequency and strength of modal interactions along specific network paths. A sharp peak in estimated coherency (near unity) usually corresponds to a mode that is common to both signals, i.e., inter-area mode. Along with the modal damping and frequency information, real-time operational knowledge of a power system's mode shape helps predict the most probable separation interface for the current system condition.

The following procedure can be followed to predict the most probable separation interface based on modal properties. The procedure may be performed by an automatic computer program at the control center:

Perform the above AWT-based damping estimation method on the angular difference of each pair of BCGs to determine the frequencies and damping ratios of top-K (e.g. K=3 or 4) dominant oscillation modes. Compare the damping ratios with the preset threshold, e.g. 3%. A low damping ratio close to zero or being negative requires immediate attention of the system operators.

Use the linear coherency-squared function defined above to determine whether the observed modes are local or inter-area modes. If the linear coherency is close to 1 (e.g. >0.7), the mode can be regarded as an inter-area mode. Otherwise, the mode may be independent or local plant mode, and requires further analysis depending on the severity of the oscillation.

Perform CSD to determine the mode shape of each inter-area mode i.e., identify whether the involved BCGs swing together or oppositely. If the absolute value of the angular difference between two BCGs is close to 180° with an allowance of, e.g., 20~30°, it determines that two BCGs swing against each other. On the contrary, if the absolute value of that angular difference is close to 0° with an allowance of, e.g., 20~30°, it determines that the two BCGs swing together. An automatic clustering algorithm can be developed based on a simple logic. For example, for a power system with three BCGs (1, 2 and 3), if BCG 1 and BCG 2 swing together, but BCG 1 and BCG3 swing against each other, a conclusion would be that BCG 3 oscillates against BCG 1 and BCG 2.

Based on mode shape information, the most probable separation interface can be predicted. The real-time control stage of the proposed separation scheme will be informed of the SSRs on that interface.

These functional steps are programmed to perform automatically and inform the most probable separation interface according to the identified mode shape. The threshold values for each step should be judiciously determined based on the engineers' knowledge and experience with the system.

In the real-time control stage, the following tasks are performed in real time, i.e. at a very short time step Δt, e.g. 0.1 s.

Calculate the risk of angle separation at the determined separation interface using real-time PMU data.

Once the risk is higher than a prescribed threshold, e.g. 90%, it will be the time to perform controlled separation.

The SSRs at the separation interface will be tripped by an automatic separation program while the others are blocked.

Perform the associated load shedding and generation rejection strategies for each island formed to stabilize generators and arrest frequency declines.

The inventive scheme structurally adopts three stages with different time frames to strategically decouple the three key problems introduced above:

To solve the problem "where", the work in the offline analysis stage reduces the search scope for separation points, and the separation points are then determined (dynamically updated) in the online monitoring stage.

To solve the problem "when", the real-time control stage determines the time to separate the system based on the information from the online monitoring stage.

To solve the problem "how", placement of SSRs is determined and associated control strategies, e.g. load shedding and generation rejection, can be designed in the offline analysis stage.

On the most probable separation interface dynamically determined or updated in the online monitoring stage, controlled system separation could be performed in the real-time control stage once the risk of angle separation (i.e. loss of synchronism) on that interface is found exceeding a preset threshold.

Figure 14:
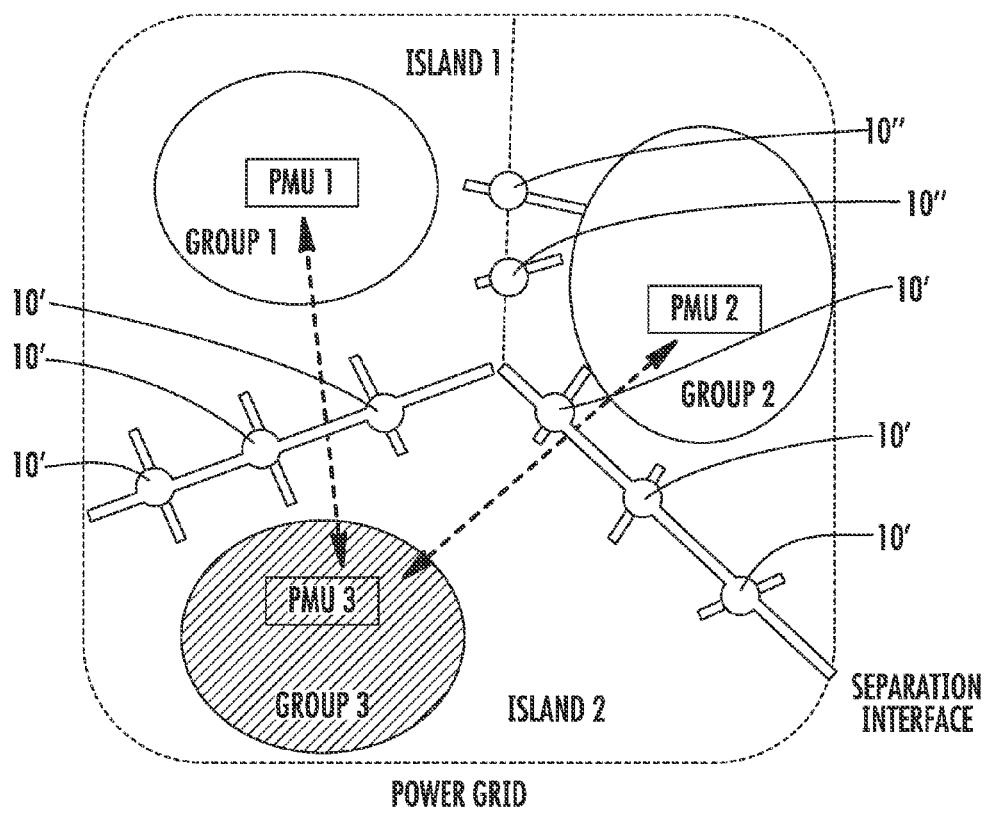
FIG. 14 shows controlled separation according to an embodiment of the invention.

Using the power system in FIG. 6 as an example, if the current generator grouping pattern identified is that Group 3 oscillates against the other two groups, two islands as shown in FIG. 14 may potentially form if the oscillation leads to angle separation. To form the two islands, the SSRs 10' in the figure should be tripped at the same time and the other relays 10" should be blocked.

For this power system, the worst case is that all three BCGs oscillate against each other and may potentially lose synchronism, and hence, controlled system separation needs to form three islands by tripping all SSRs 10 in the figure. Thus, the risk of angle separation at each of the following interfaces, which each separate one island from the rest of the system, can be estimated:

Risk 1: Group 1 v.s. Group 2 plus Group 3
Risk 2: Group 2 v.s. Group 1 plus Group 3
Risk 3: Group 3 v.s. Group 1 plus Group 2

If any of the three risks, say Risk 1, is found exceeding the preset threshold, it is suggested that three islands be formed at the same time by tripping all SSRs. The reason is that even if the other two risks, Risk 2 and Risk 3, are still below the threshold, the angle separation between Group 1 and the other two groups may impact the connection of the two groups to cause their angle separation. If the three islands are formed simultaneously, the generators in each island easily survive since they tend to be coherent before separation. Thus, the timing of separating a power system into three or more islands can be determined according to the highest one among the risks on those two-island separation interfaces that can isolate one island from the rest of the system.

Figure 15:
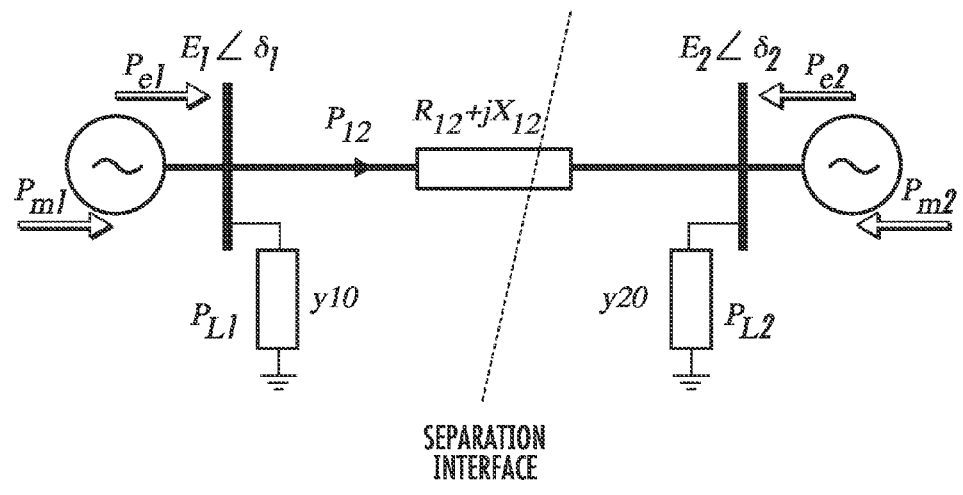
FIGS. 15 and 16 show two-generator equivalents at the separation interface.

At a predicted two-island separation interface, the power system can be separated to from two islands (denoted by island 1 and island 2). The generators (one or several BCGs) on either side of the interface can be regarded as one equivalent generator as shown in FIG. 15. For the power system in FIG. 14, island 1 contains two BCGs and island 2 contains one BCG.

$\delta_i$ (i=1 or 2) is the average value of the phase angles measured by PMUs in island I, and the steady-state value of $\delta_1$ is bigger than that of $\delta_2$. If PMUs are placed at main generator buses, $\delta_i$ would be their average rotor angle. $P_{12}$ is the MW flow transferred from island 1 to island 2 crossing that interface, and satisfies $$P_{12} \approx \frac{E_1 E_2}{X_{12}} \sin\delta_{12}, \text{ where } \delta_{12} = \delta_1 - \delta_2.$$

Figure 16:
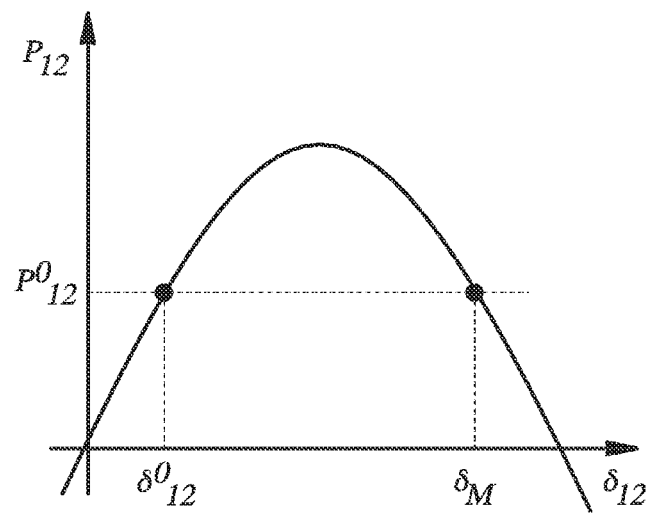

$P_{12}$ and $\delta_{12}$ have an approximately sinusoidal relationship as shown in FIG. 16. Assume that within each swing of $\delta_{12}$, $E_1$, $E_2$ and $1/X_{12}$ do not significantly change, which respectively indicate the voltage levels of two potential islands and the strength of their connection.

If at the steady state, $P_{12}=P^0_{12}$ and $\delta_{12}=\delta^0_{12}$, once $\delta_{12}$ goes out of its stability limit $\delta_M = 180 - \delta^0_{12}$, the two potential islands will lose synchronism. At any time step $t=t_0$, $\delta_{12}(t)$ over the next $\Delta t$, i.e. $[t_0, t_0+\Delta t]$, can be approximated by the sum of K most dominant oscillation modes detected at the separation interface in the Online Monitoring stage:

$$\delta_{12}(t) \approx \delta^0_{12} + \sum_{i=1}^{K} A_i e^{-\zeta_i \omega_{ni}(t-t_0)} \cos(\omega_{di} t + \varphi_i),$$

$$\omega_{di} = \sqrt{1 - \zeta_i^2}\, \omega_{ni}.$$

$\delta^0_{12}$ can be calculated by averaging $\delta_{12}(t)$ over the latest time window $[t_0-T, t_0]$. In the Online Monitoring stage, $\omega_{ni}$ and $\zeta_i$ can be estimated.

The following algorithm can be used to estimate the angle separation risk, which is equal to the probability of $\delta_{12}$ going out of its stability limit in its next swing.

Solve all $A_i$ at the time $t_0$ using $\delta_{12}(t) \sim \delta_{12}^{(2K-1)}(t)$ (derivatives of orders<2K) estimated using PMU data.
Calculate $$A = \delta^0_{12} + \sum_{i=1}^{K} A_i,$$

which is the maximum value that $\delta_{12}$ might reach.
Calculate angle separation risk $$R = \min\left(\frac{A}{\delta_M}, 1\right) \times 100\%,$$

where $\delta_M = 180 - \delta^0_{12}$.
For the simplest case that only considers the first dominant mode to calculate the risk, the following equation is used:

$$\delta_{12}(t) = \delta^0_{12} + A e^{-\zeta\omega_n(t-t_0)} \cos(\sqrt{1-\zeta^2}\,\omega_n t + \phi)$$

It is easy to obtain, at time $t_0$:

$$A = \delta^0_{12} + \sqrt{\delta^2_{12}(t_0) + \left(\frac{\frac{d\delta_{12}(t_0)}{dt} + \zeta\omega_n \delta_{12}(t_0)}{\sqrt{1-\zeta^2}\,\omega_n}\right)^2}.$$

If R exceeds a preset threshold $R_M$ (e.g. 90%), controlled system separation can be performed by tripping the SSRs at the predicted separation interface.

To implement this separation scheme, an automatic separation program that integrates the main functions of the online analysis and real-time control stages may be deployed at the control center. The program collects PMU data to monitor system oscillations and predict the separation time. It may interface with SCADA/EMS to also obtain the current operating point to adaptively optimize separation points. The program, online, automatically determines which SSRs should be blocked and simultaneously sends tripping signals to only the SSRs at the determined separation points. The system operator may also add control to the program, e.g. adjusting its settings and even disabling it when controlled system separation is not required.

Example

Figure 17:
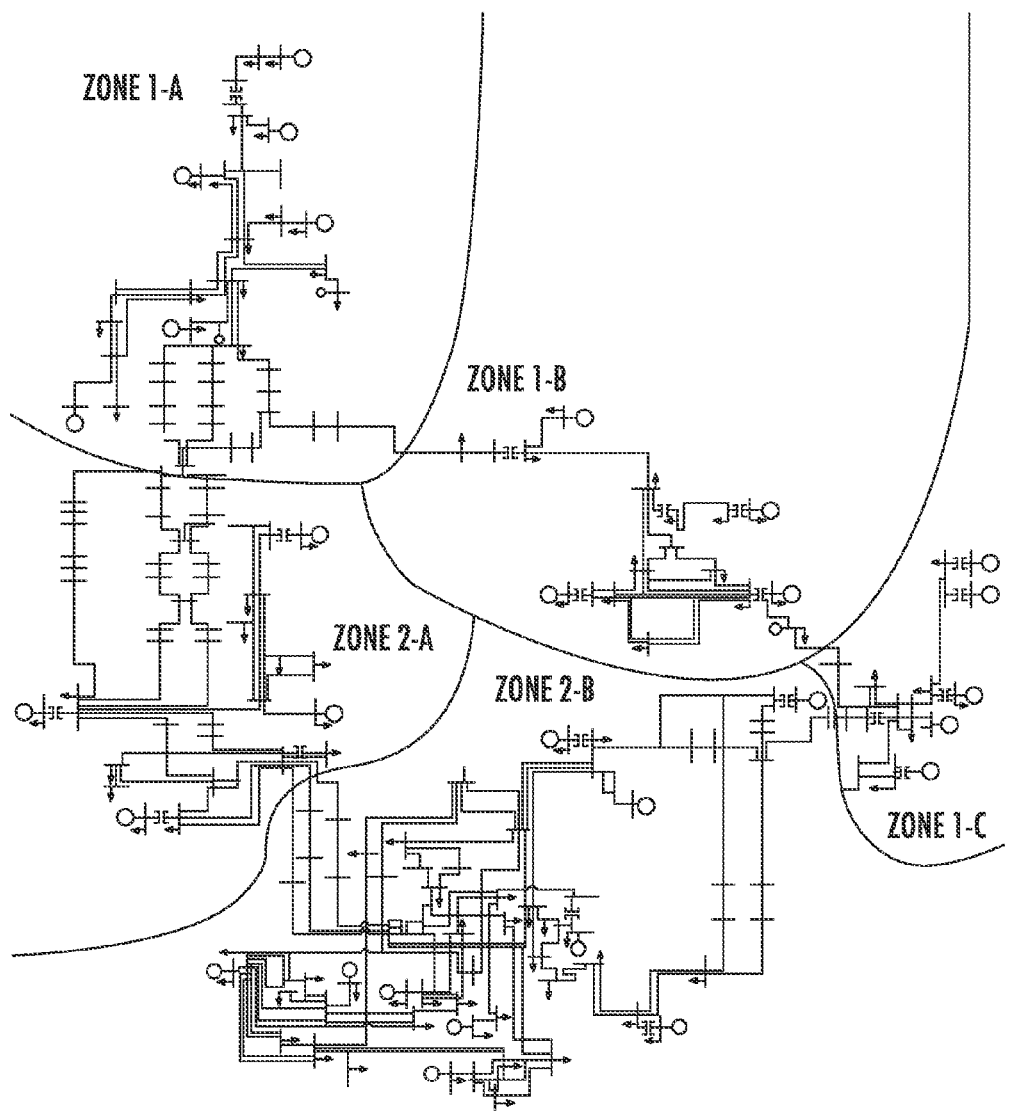
FIG. 17 shows a 179-bus power system.

A 179-bus system, shown in FIG. 17, is a simplified model of a WECC AC transmission system. The system has 29 generators, 179 buses and 263 branches. The base case has a total generation of 61.4 GW and a total load of 60.8 GW.

To demonstrate the inventive controlled system separation scheme, a multi-contingency process continuously weakening the system until angle separation was used. The multi-contingency process contains 6 successive three-phase faults and line trips around the Malin interface (bus 83 in the 179-bus system), which was involved in the 1996 US Western Interconnection blackout. Table 2 gives these faults, which occur at the interval of 40 seconds and are respectively cleared after 6 cycles by tripping the fault lines. "#" indicates the locations of the three-phase faults. Note that these faults and line trips never break the connection at the Malin interface.

Figure 18:
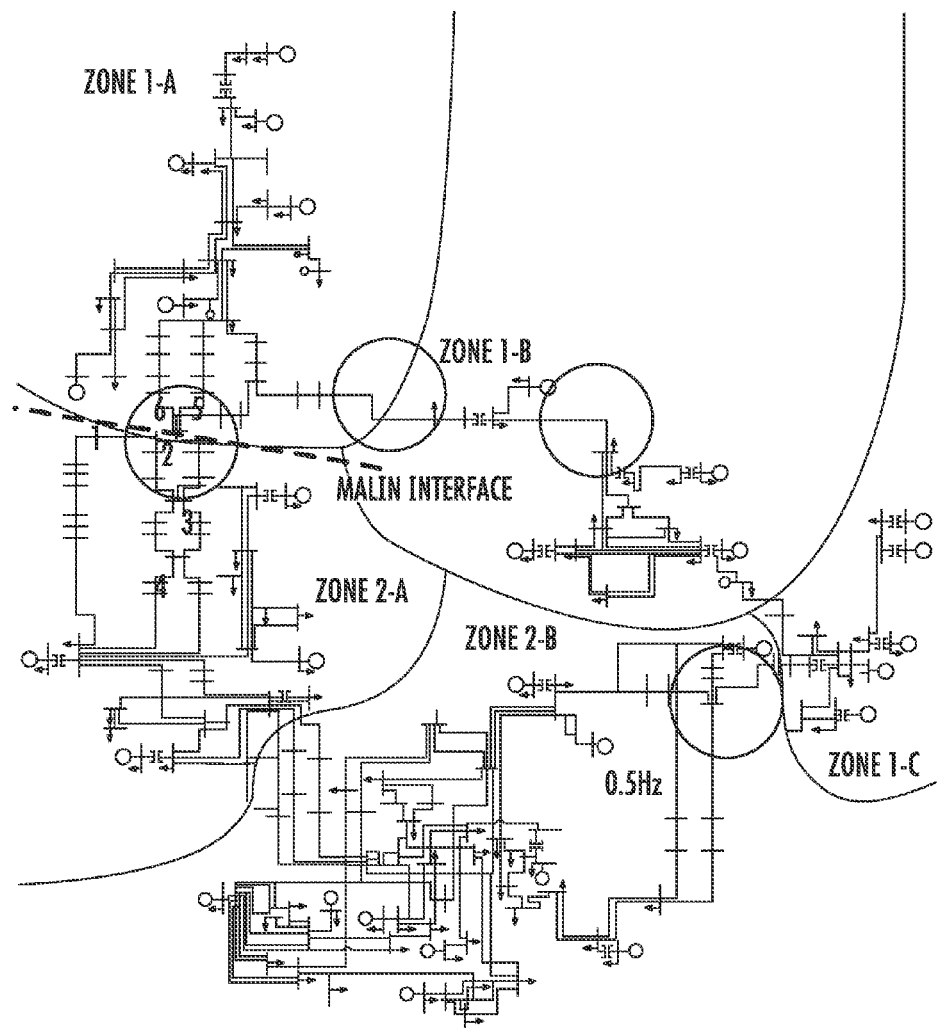
FIG. 18 shows locations of contingencies in the 179-bus power system of FIG. 17.

The locations of the six faults are also indicated by numbers in FIG. 18. The figure also highlights the areas where transmission lines may potentially become overloaded after loss of those fault lines. This means that even if the system is not actively separated by the control center, it might separate in some uncontrolled manner after some lines are tripped due to local overloading protection.

TABLE 2

| Serial Number | Occurrence Time (s) | Tripped Line |
| --- | --- | --- |
| 1 | 0 | 83#-172 |
| 2 | 40 | 83#-170 |
| 3 | 80 | 114#-124 |
| 4 | 120 | 115#-130 |
| 5 | 160 | 83#-94 |
| 6 | 200 | 83#-98 |

Figure 19:
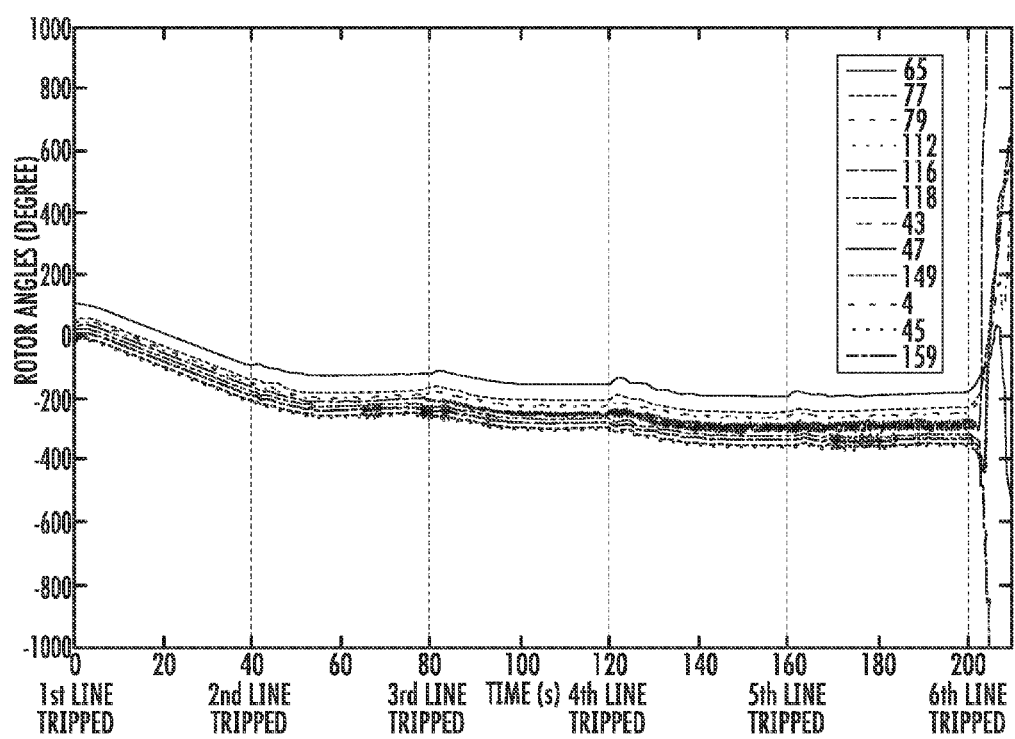
FIG. 19 shows a multi-contingency process leading to angle separation.

After the final line is tripped, angle separation occurs. FIG. 19 provides the rotor angle curves of 12 representative generators. From this figure, generators keep synchronous before $t=200$ s. However, obvious oscillations occur after the third line is tripped and grow while more lines are tripped. Those oscillations last for more than 100 seconds. The inventive scheme mines valuable information from oscillations in the online monitoring stage and predicts the final angle separation in the real-time control stage.

To demonstrate the inventive scheme, tasks of each stage are presented in detail.
  In the offline analysis stage, the tasks are to place PMUs and SSRs for all probable out-of-step patterns and design additional control strategies (load shedding or generation rejection) for probable island formations. Those tasks are performed without knowing the multi-contingency process.

The tasks in the online monitoring stage can periodically be performed, e.g., every 5 seconds on the latest 40 seconds time window to monitor oscillations in order to predict in what pattern generators may become out of step before that occurs.

Based on the predicted out-of-step pattern, the time to perform controlled system separation will be determined in real time (in the real-time control stage). The effectiveness of controlled system separation together with additional control performed at the separation time will be tested by time-domain simulations.

Figure 20:
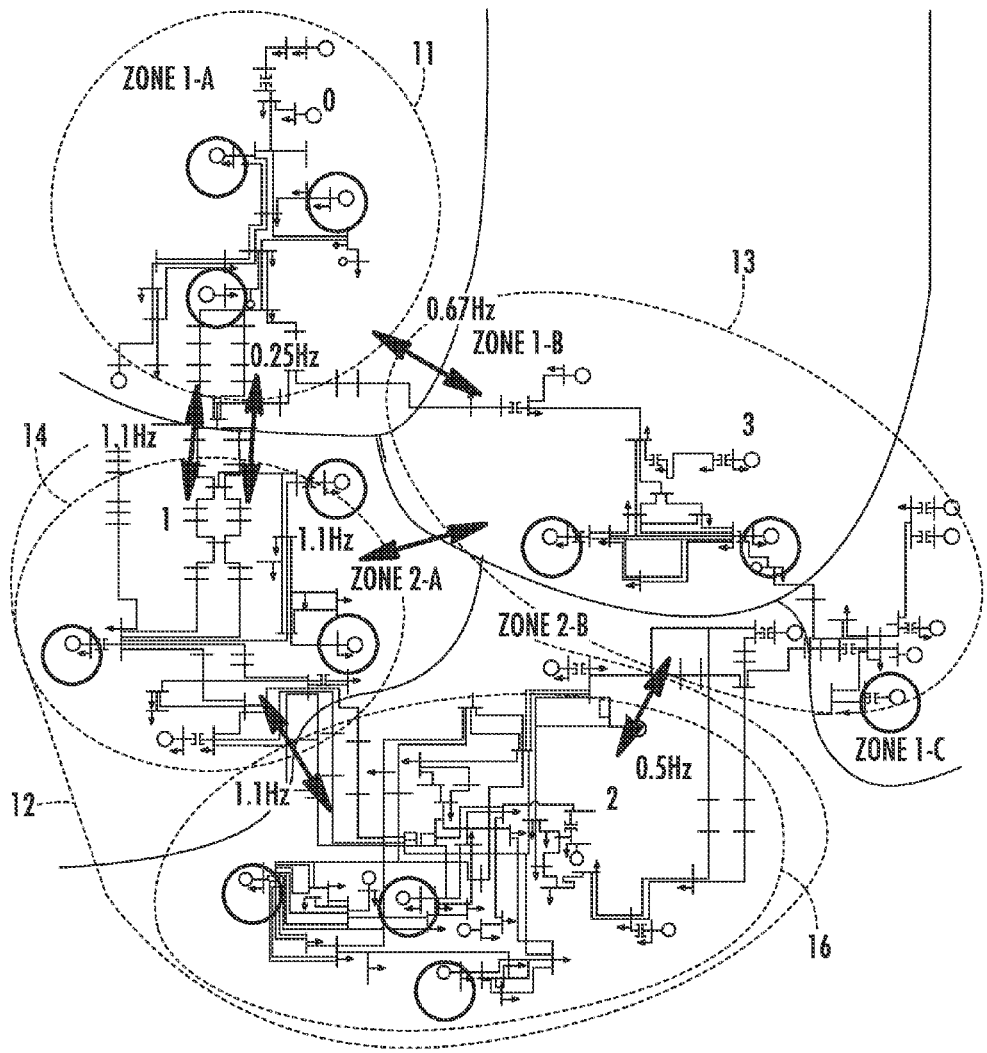
FIG. 20 shows coherent generator groups of the 179-bus power system of FIG. 17.

In order to identify all possible out-of-step patterns, generation coherency is studied using the slow-coherency method. The following analysis results were reported:

The system has three coherent generator groups 11, 12, and 13 in FIG. 20. They may oscillate against neighbors at frequencies around 0.25 Hz, 0.67 Hz and 0.5 Hz.

Group 12 may further separate into two coherent groups 14 and 16 in FIG. 20. One group may oscillate against neighboring groups at frequencies around 1.1 Hz.

The four groups are numbered, 0, 1, 2 and 3, as shown in FIG. 20, and are regarded as four BCGs of the 179-bus power system. The generators in each BCG are given in Table 3.

TABLE 3

| BCGs | Generator Bus Numbers | PMU Locations |
|---|---|---|
| 0 | 30, 35, 65, 70, 77, 79 | 65, 77, 79 |
| 1 | 112, 116, 118, 103 | 112, 116, 118 |
| 2 | 13, 15, 40, 43, 47, 138, 140, 144, 148, 149 | 43, 47, 149 |
| 3 | 4, 6, 9, 11, 18, 36, 45, 159, 162 | 4, 159, 45 |

Any single or two BCGs may separate from the rest and cause an out-of-step pattern. Thus, there are a total of seven out-of-step patterns:

Group 0 separates from the others
Group 1 separates from the others
Group 2 separates from the others
Group 3 separates from the others
Groups 0 and 1 separate from groups 2 and 3
Groups 0 and 3 separate from groups 1 and 2
Groups 0, 1, 2, and 3 all separate from each other In order to predict the out-of-step pattern from the above seven possibilities, PMUs would be available in each group. Assuming that PMUs are installed at the 12 generator buses given in Table 3, three PMUs are utilized to monitor one BCG. The locations of the 12 PMU buses are shown in FIG. 20.

The placement of SSRs should give considerations to the constraints for separation points. Their optimal locations will be potential separation points for the 179-bus power system. The locations of SSRs are determined by the following procedure.

Figure 21:
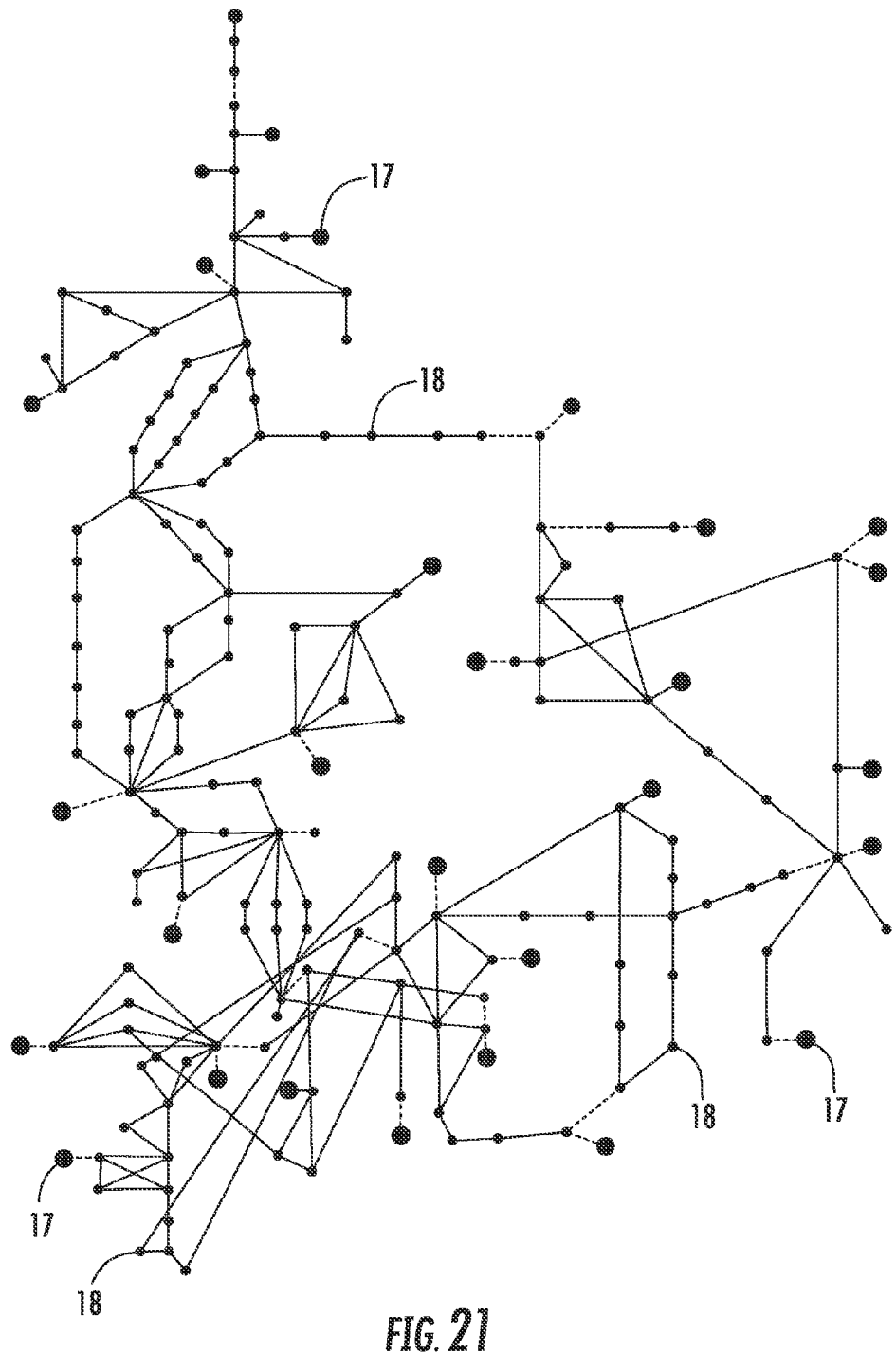
FIG. 21 shows the graph-theory representation of a 179-bus power system.

Use a graph to represent the power system as shown in FIG. 21, where generator nodes 17 are larger to differentiate them and the load nodes 18.

Figure 22:
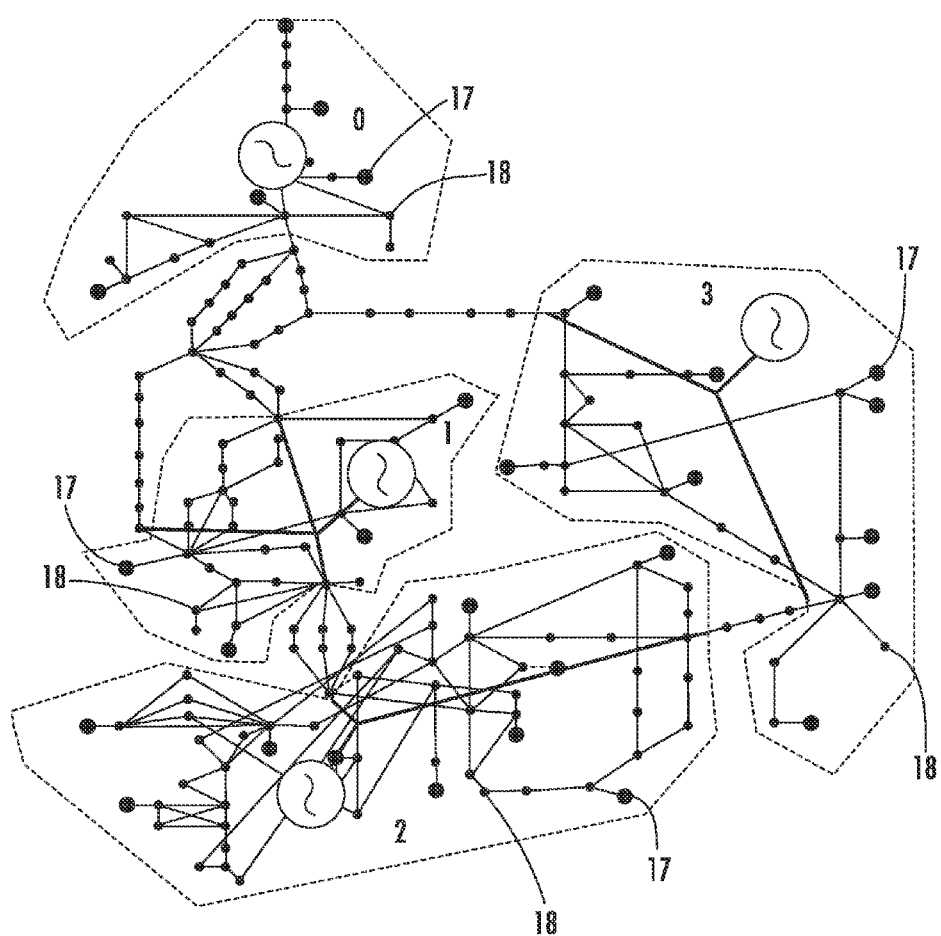
FIG. 22 shows a simplified version of the 179-bus power system of FIG. 21.

Merge each area (as shown in FIG. 22) that contains one BCG's generator nodes 17 and the load nodes 18 helping connect its generator nodes into an equivalent generator node to simplify the original graph to a 45-node graph with 4 generator nodes (corresponding to the four BCGs) numbered 0 to 3. The power output at each equivalent generator node equals the total generation minus the total load of the corresponding area. According to the power-flow base case, only equivalent generators 0 and 3 have positive net power outputs.

Consider the placement of SSRs among the lines in the simplified graph. To ensure that controlled system separation is able to address any of the seven out-of-step patterns mentioned above, SSRs should enable islanding each equivalent generator, i.e. one BCG. The load nodes in the simplified graph all have low load except for node 83, which should be allocated to an equivalent generator with positive net power output. Since equivalent generator 0 is closer to node 83 and more tightly connected with it in topology, node 83 will be in its island.

Figure 23:
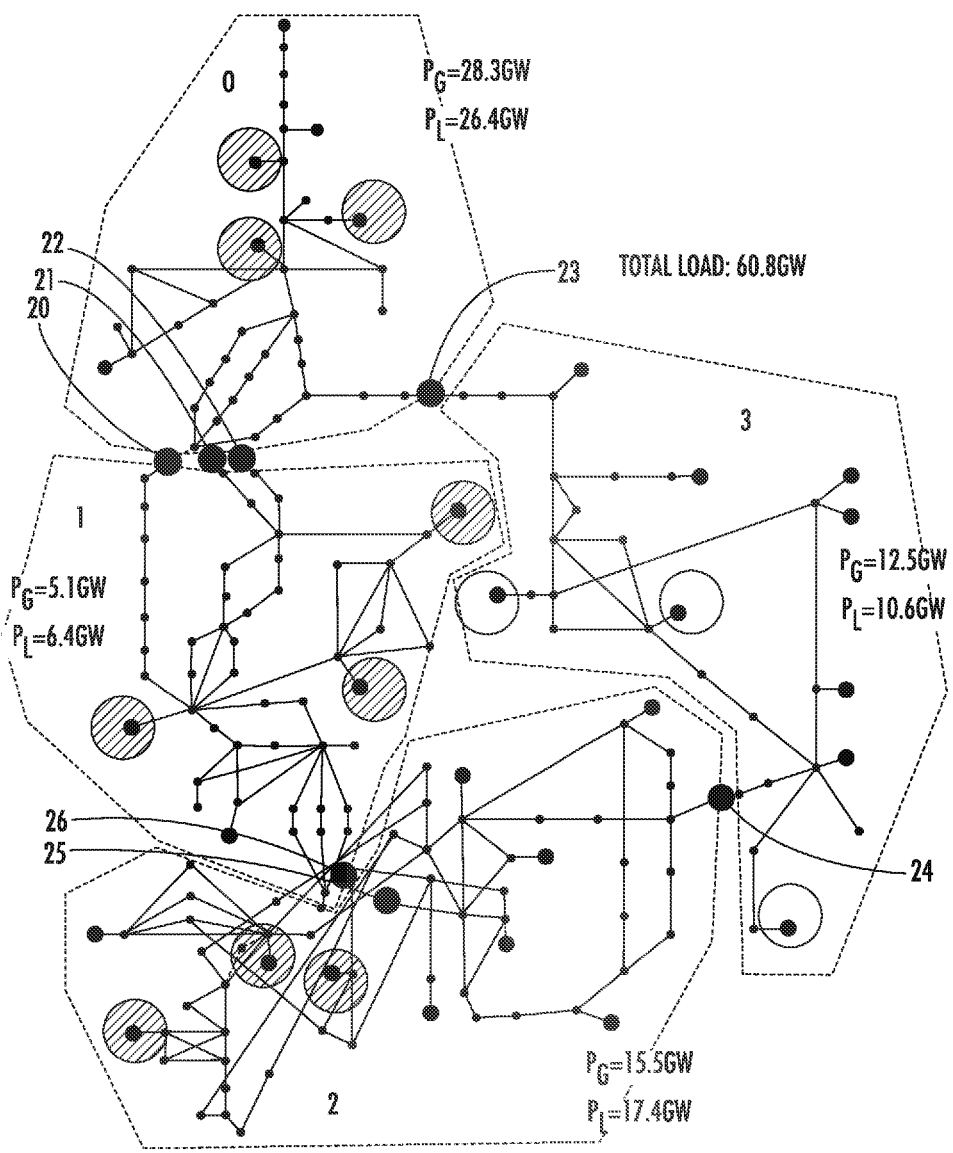
FIG. 23 shows potential separation points and islands for the 179-bus power system.

Thus, seven potential separation points are determined on seven interface lines to partition the system into four areas as shown in FIG. 23. Place SSRs at the potential separation points 20-26.

Interface 0-1 (3 lines): lines 83-168, 83-170 and 83-172
Interface 0-3 (1 line): line 81-99
Interface 1-2 (2 lines): lines 142-153 and 153-154
Interface 2-3 (1 line): line 28-29

The generation-load imbalance of each area is given in Table 4. The worst case is that all seven SSRs are tripped to separate all four areas.

TABLE 4

| Area | Generation (GW) | Load (GW) | Imbalance (GW) |
|---|---|---|---|
| 0 | 28.3 | 26.4 | 1.9 |
| 1 | 5.1 | 6.4 | −1.3 |
| 2 | 15.5 | 17.4 | −1.9 |
| 3 | 12.5 | 10.6 | 1.9 |

The load shedding and generation rejection strategies associated with controlled system separation need to be designed in the offline analysis stage. Once an area in FIG. 23 is isolated to form an island, its load shedding or generation rejection strategies should be performed immediately to quickly stabilize its generators and arrest frequency excursions.

According to Table 4, areas 0 and 3 are rich in generation, which may need to reject some generation after islanded, and areas 1 and 2 are rich in load, where some load may be shed after separation. How much generation or load needs to be reduced in each formed island can be determined for given frequency upper/lower limits by time-domain simulations. The final amount of load shedding or generation rejection depends on generator governors' regulation capabilities in each island, and may not exactly match the estimated imbalance in Table 4.

Table 5 gives all 11 probable islands formed after controlled system separation. Assume that the required frequency range for each island is 59.5~60.5 Hz. Time-domain simulations are performed on islanding each of those areas and immediately performing load shedding or generation rejection. The second column of the table gives the additional control strategies that can maintain frequencies within that frequency range. The percentages are calculated based on the total load of the system, i.e. 60.8 GW. From the results, no generation needs to be rejected after system separation. For five of the islands, no additional control is needed after system separation.

TABLE 5

| 11 Probable Islands | Additional Control |
|---|---|
| Area 0 | No need |
| Area 1 | Shed 2,200MW (3.6%) |

TABLE 5-continued

| 11 Probable Islands | Additional Control |
|---|---|
| Area 2 | Shed 2,300MW (3.8%) |
| Area 3 | No need |
| Area 0 plus Area 1 | No need |
| Area 0 plus Area 3 | No need |
| Area 1 plus Area 2 | Shed 4,500MW (7.3%) |
| Area 2 plus Area 3 | Shed 900MW (1.5%) |
| Areas 0, 1 and 3 together | No need |
| Areas 0, 1 and 2 together | Shed 2,500MW (4.1%) |
| Areas 1, 2 and 3 together | Shed 3,000MW (4.9%) |

In the real-time control stage of the inventive controlled system separation scheme, once any island in Table 5 is formed, the corresponding control strategy will be immediately applied.

In the proposed controlled system separation scheme, rotor angles of 12 representative generators are measured by PMUs for spectral analysis damping analysis and mode shape analysis in the online monitoring stage. An alternative option is to use the voltage phase angles measured by PMUs at those generator buses in the proposed scheme.

Figure 24:
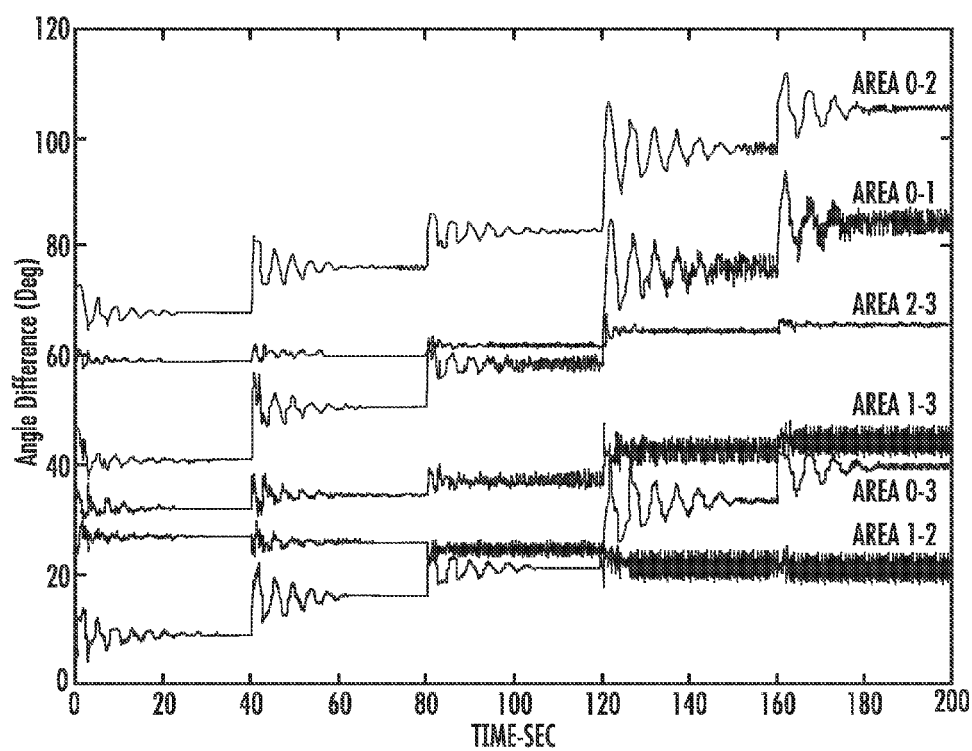
FIG. 24 shows angular differences between areas.

Since PMUs are placed at three generators in each of the four areas as shown in FIG. 23, the average voltage magnitude of the three generators can be regarded as the angle of that entire area. FIG. 24 illustrates the angular differences between the areas along the simulation time. The following were found:

Damping is decreasing indicating potential loss of synchronism.

After each fault, big changes can be observed in angular differences between Areas 0 and 3, between Areas 0 and 1, and between Areas 0 and 2.

Areas 2 and 3 and Areas 1 and 2 seem to be more tightly coupled.

Thus, an intuitional guess by human is that Area 0 separates from the rest of the system. The inventive scheme utilizes AWT-based spectral analysis and damping analysis techniques to determine the most probable separation interface, which confirms that guess.

Figure 25:
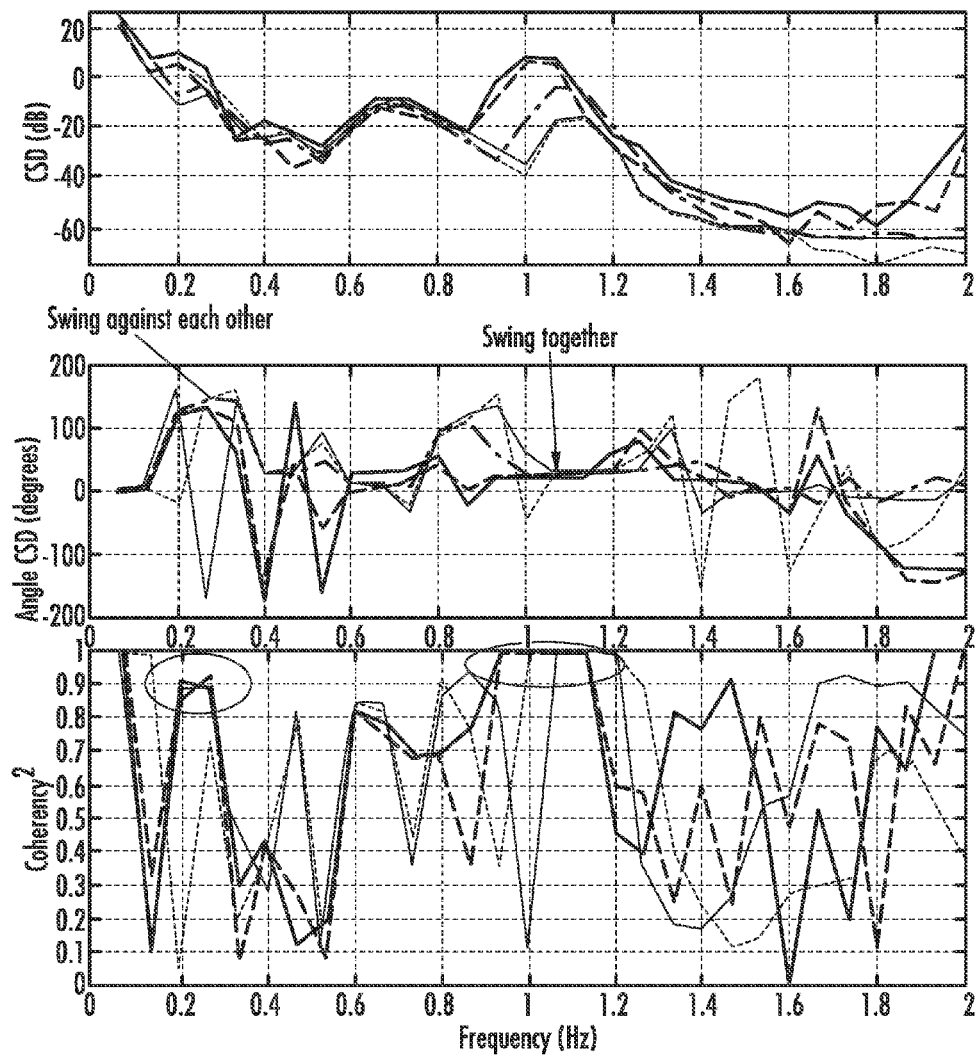
FIG. 25 shows the cross power spectrum of the angle difference between areas 0 and 1.

Results from a Cross Power Spectrum (CPS) analysis of the angular difference between Areas 0 and 1 are presented in FIG. 25. The top plot illustrates the change of the Cross Spectral Density (CSD) magnitude, which indicates the changes of resonant frequencies's peaks as the system becomes more stressed due to the successive faults: The thinnest line illustrates the results over a 40-second time window after the first fault. The thickest line indicates the CPS results after the fifth fault. The middle plot shows the corresponding phase angle changes of the CPS, which tell the mode shape. The bottom plot shows the values of the linear coherency-squared function for different modes.

Although the figures cross an oscillation frequency range of 0-2 Hz, we may only look at the modes around the oscillation frequencies identified offline, i.e. 0.25 Hz, 0.67 Hz, 0.5 Hz and 1.1 Hz as highlighted in FIG. 25. For the angular difference between Areas 0 and 1, 0.25 Hz and 1.1 Hz are two dominant oscillation modes in terms of the magnitude of the CSD from the top plot. From the middle plot, Areas 0 and 1 tend to swing against each other at around 0.25 Hz because the phase angle is close to 180° and from the bottom plot, the linear coherency is near to the unity, which corresponds to the information obtained in the offline analysis stage.

Figure 29:
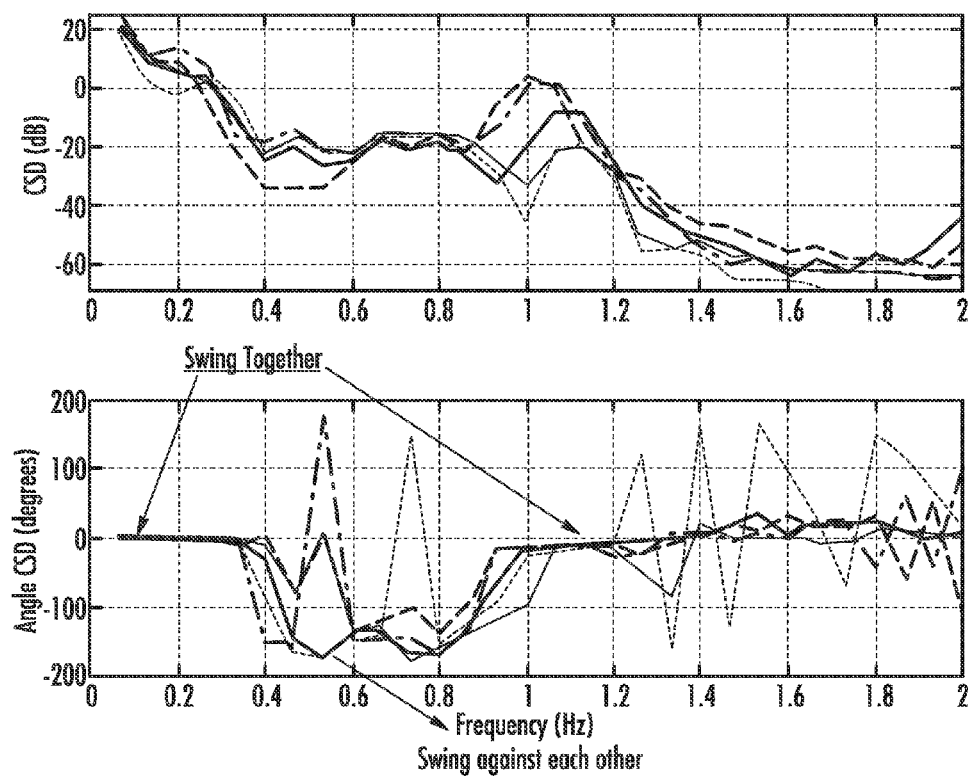
FIG. 29 shows cross power spectrum between areas 1 and 3.

Similarly, the CPS analysis was performed for the other areas. As an example, FIG. 29 shows the magnitude and angle of the CSD between areas 1 and 3. The online spectral analysis helps confirm the oscillation modes identified in the offline analysis stage. For example, it confirms the inter-area oscillations at around 0.5 Hz between Areas 2 and 3, at around 0.67 Hz between Areas 0 and 3, by observing the phase angles between areas.

Figure 26:
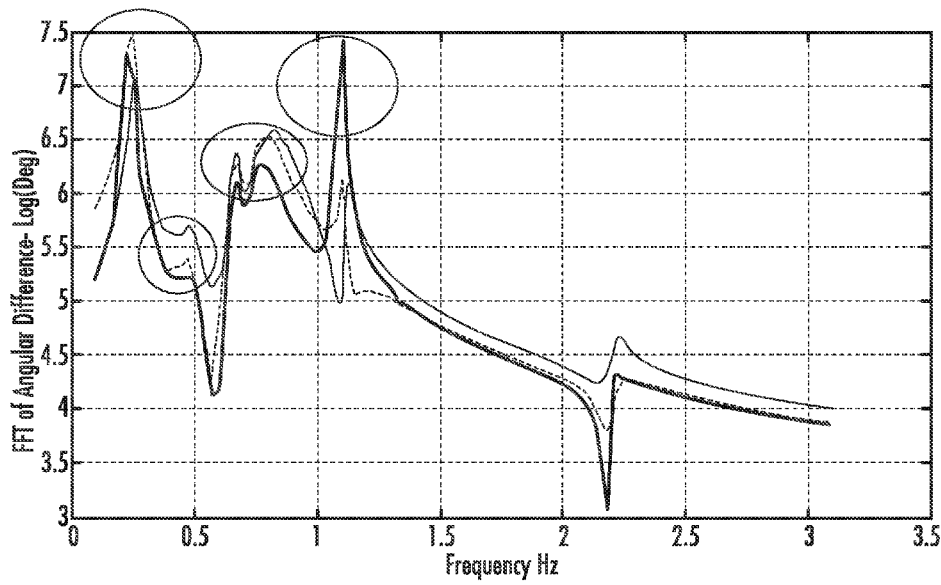
FIG. 26 shows resonant frequencies of the angular difference between areas 0 and 1.
Figure 27:
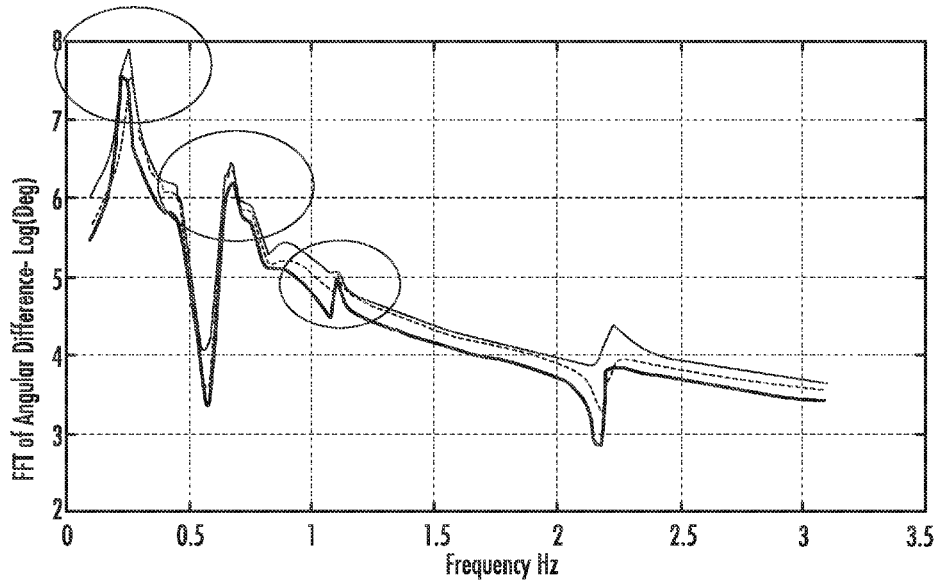
FIG. 27 shows resonant frequencies of the angular difference between areas 0 and 3.

Dominant modes can also be identified from FFT results of angular differences. As examples, FIGS. 26 and 27 give the FFT results of the angular differences between Areas 0 and 1 and between Areas 0 and 3, respectively. The peaks indicate the dominant oscillation modes.

Spectral analysis shows that among those modes, the mode at 0.25 Hz is the most dominant one. Finally the following conclusions can be drawn:

Areas 0 and 1 swing against each other at 0.25 Hz.
Areas 2 and 3 swing together at 0.25 Hz.
Areas 1 and 2 swing together at 0.25 Hz.
Areas 1 and 3 swing together at 0.25 Hz.

Figure 28:
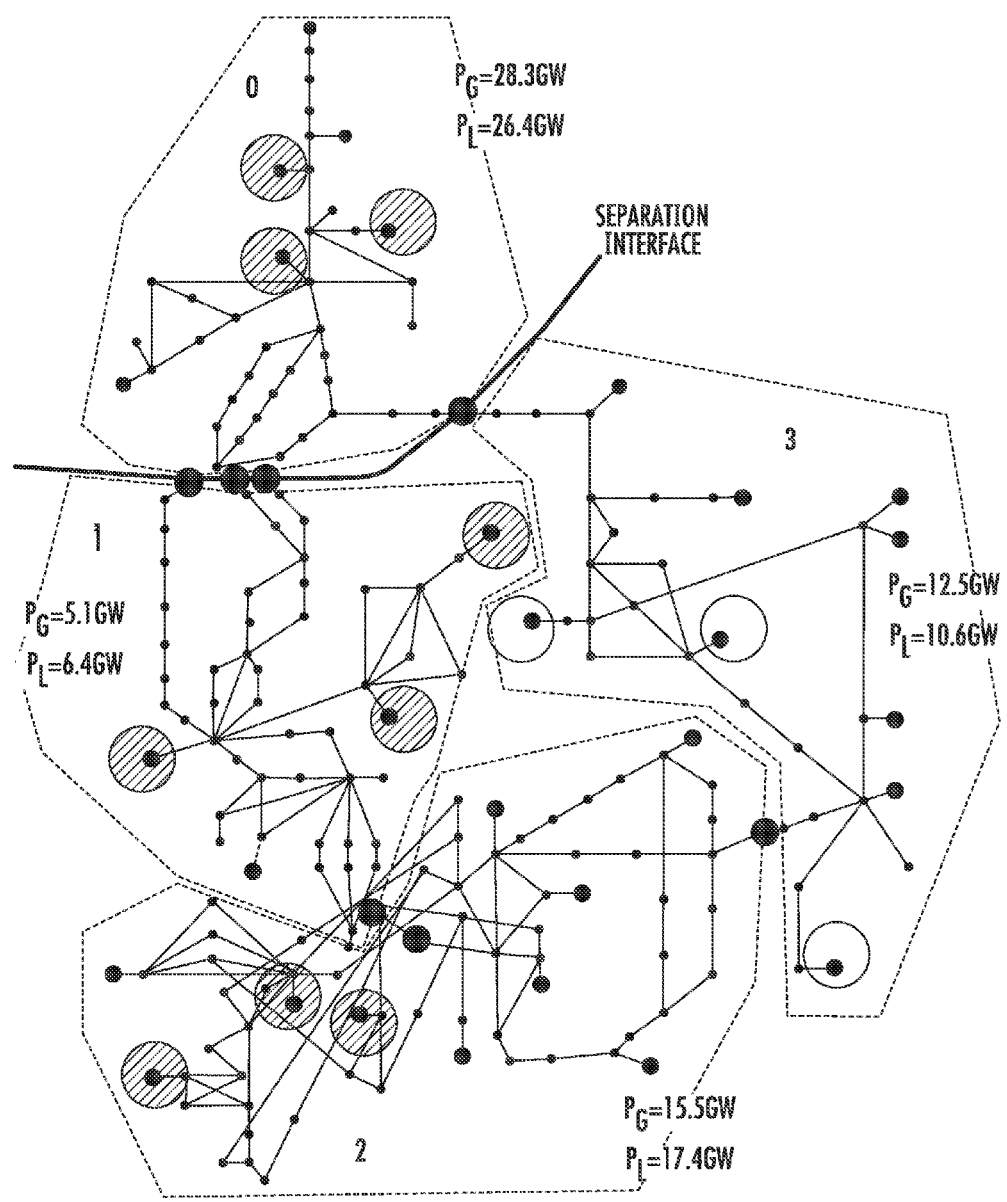
FIG. 28 shows a predicted separation interface.

Thus, a conclusion is that Area 0 swings against Areas 1, 2 and 3 at 0.25 Hz. It further refines the information, and finds the most probable separation interface, which is between Area 0 and the others. Thus, as shown in FIG. 28, four lines should be opened by SSRs once angle separation is predicted:

Interface 0-1 (3 lines): lines 83-168, 83-170 and 83-172.
Interface 0-3 (1 line): line 81-99.

From Table 5, 3,000 MW (4.9% of the total system load) should be shed in the south island.

Since the real-time control stage will utilize damping information of the oscillation modes at the determined separation interface and modes at 0.25 Hz and 1.1 Hz are overall stronger than the others from FIG. 26 and FIG. 27, the damping analysis will focus on estimating the damping ratios of modes around 0.25 Hz and 1.1 Hz.

Results from the AWT-based damping estimation method shows:

Damping of 1.1 Hz mode is drastically decreased to close to 0%, and

Damping of 0.25 Hz stays at around 6%

In the online monitoring stage, it is identified that the most severe oscillations appear at the interface between Areas 0 and 1. Two dominant oscillation modes (named modes a and b) are at frequencies around 0.25 Hz (denoted by $f_{na}$) and 1.1 Hz (denoted by $f_{nb}$).

The real-time angle separation risk can be estimated as follows:

Let $\delta$ be the difference between the average angles of the north island (Area 0) and the south island (Areas 1, 2 and 3), which can be estimated by $$\delta(t) = \overline{\delta}_N - \overline{\delta}_S$$
$$= \frac{\delta_{65} + \delta_{77} + \delta_{79}}{3} -$$
$$\frac{\delta_{112} + \delta_{116} + \delta_{118} + \delta_{43} + \delta_{47} + \delta_{149} + \delta_4 + \delta_{159} + \delta_{45}}{9}.$$

From above, for a short time following a time step $t=t_0$ $$\delta(t) - \delta^o \approx \delta^a(t) + \delta^b(t) = A_a e^{-\zeta_a \omega_{na}(t-t_0)} \cos(\sqrt{1-\zeta_a^2}\omega_{na}t + \phi_a) + A_b e^{-\zeta_b \omega_{nb}(t-t_0)} \cos(\sqrt{1-\zeta_b^2}\omega_{nb}t + \phi_b).$$

$\delta^o$ is an estimated steady-state value of $\delta$. Since there is a 0.85 Hz difference between the frequencies of two oscillation modes, a feasible approach is to respectively obtain $\delta^a$ and $\delta^b$ by a low-pass filter and a high-pass filter, e.g., both with a pass-band-edge frequency of 0.5 Hz, as shown by the following equations:

$$\delta^a(t) = \text{LowPassFilter}_{0.5Hz}(\delta(t)-)\delta^0)$$

$$\delta^b(t) = \text{HighPassFilter}_{0.5Hz}(\delta(t)-\delta^0)$$

Damping ratios $\zeta_a$ and $\zeta_b$ are estimated as around 6% and 0% respectively after the fifth line trip (before the final fault and line trip). Because $f_{nb}$ is four times of $f_{na}$, the two modes are almost decoupled. Thus, their peaks $A_a$ and $A_b$ at $t=t_0$ can be solved independently as follows:

$$A_a = \sqrt{[\delta^a(t_0)]^2 + \left[\frac{\frac{d\delta^a(t_0)}{dt} + \zeta_a \omega_{na}\delta^a(t_0)}{\sqrt{1-\zeta_a^2}\,\omega_{na}}\right]^2}$$

$$A_b = \sqrt{[\delta^b(t_0)]^2 + \left[\frac{\frac{d\delta^b(t_0)}{dt} + \zeta_b \omega_{nb}\delta^b(t_0)}{\sqrt{1-\zeta_b^2}\,\omega_{nb}}\right]^2}.$$

For this multi-contingency process, initial angular difference between the two potential islands is around 72.7°. Let $\delta^0=72.7°$. Thus, $\delta_M=180-72.7=107.3°$. The angle separation risk R can be calculated by $$R = \frac{72.7 + A_a + A_b}{107.3}.$$

Figure 30:
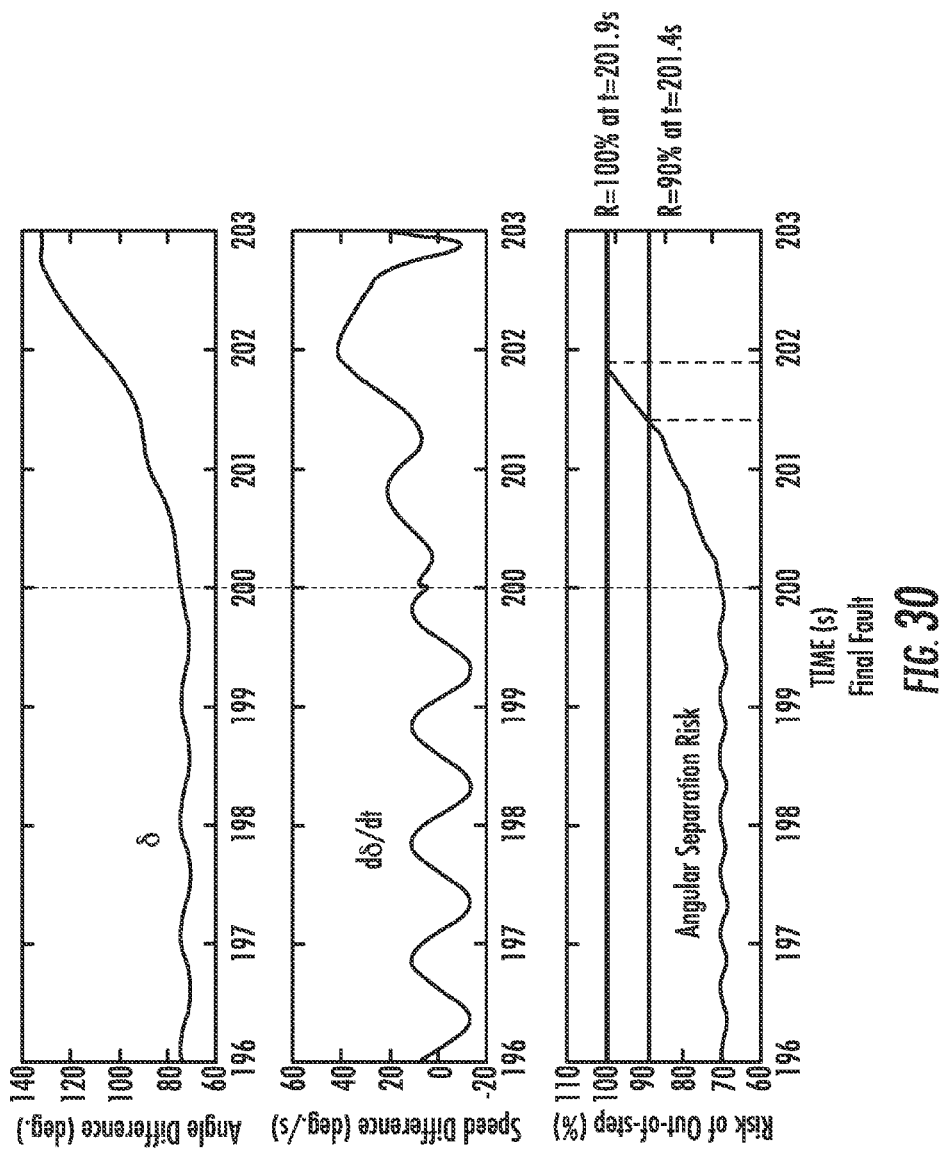
FIG. 30 shows angle separation risk.

The calculation results around the final fault are shown in FIG. 30. At t=201.4 s, R reaches 90%, and at t=201.9 s (1.9 s after the final fault), R is estimated as 100%.

Figure 31:
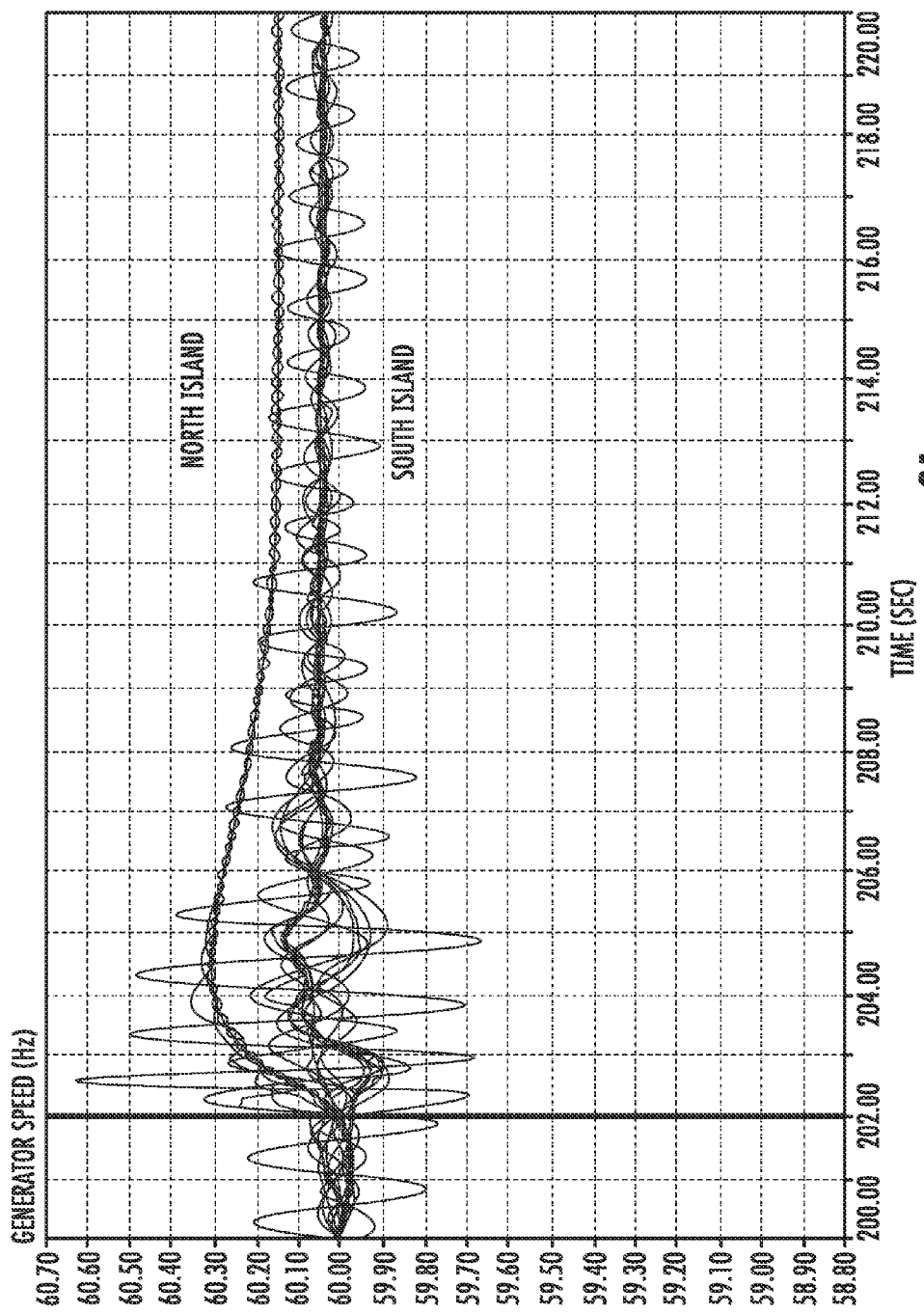
FIG. 31 shows generator frequencies after system separation.

Assume that controlled system separation and the associated load shedding strategy are executed when R is estimated as 100%. FIG. 31 shows the time-domain simulation results of generator frequencies after the system is separated and 3000 MW (4.9%) load is shed in the south island. After system separation, both islands are stable. The frequencies of the north and south islands are respectively stabilized around 60.15 Hz and 60.04 Hz.

To develop a reliable separation scheme, delays in execution should be considered. For this case, separating the system at different times increasing from t=200 s is simulated. The simulations show:

Any execution of system separation at the predicted interface before t=202.5 s can successfully form two stable islands with frequencies within 59.5 Hz~60.5 Hz like FIG. 31. This means that for this case, a delay of 0.6 s after R exceeds 100% is allowed in executing system separation without influencing its effectiveness.

If the system is separated after t=202.5 s, the north island will still become stable spontaneously but few individual generators in the south island may lose stability after the separation.

Assume that the unstable individual generators can be automatically tripped by their generator protection relays. Then, simulation results on separation performed at different times are provided in Table 6. Frequencies of the generators left in two islands are also provided in the third column, which are stabilized in the 59.5 Hz~60.5 Hz range.

TABLE 6

| Separation Time (s) | Additional Control | Generator Frequencies (Hz) |
|---|---|---|
| 202.5 | Shed 3,000MW load in the south island | 60.01~60.14 |
| 202.6 | Shed 3,000MW load in the south island and trip generator 112 | 60.01~60.14 |
| 202.7 | Shed 3,000MW load in the south island and trip generator 112 | 60.01~60.14 |
| 202.8 | Shed 3,000MW load in the south island and trip generator 112 | 60.01~60.14 |
| 202.9 | Shed 3,000MW load in the south island and trip generators 112, 116 and 118 | 60.11~60.14 |
| 203.0 | Shed 3,000MW load in the south island and trip generators 112, 116, 118 and 4 | 60.11~60.14 |

The foregoing has described PMU-based controlled system separation method to protect against a catastrophic blackout. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A phasor measurement units (PMU)-based controlled system separation method to protect against catastrophic blackouts, comprising the steps of:
   (a) performing an offline analysis of an electrical transmission network to analyze topological and dynamic characteristics of a power grid, and based on those characteristics, partition generators into a number of coherent groups;
   (b) performing online monitoring of the transmission network to continuously monitor oscillation modes and their modal properties, determine how the coherent groups group under current operating conditions, and to determine a separation interface based on mode shape of the oscillation modes; and
   (c) performing real-time control to estimate the risk of system separation and perform controlled separation in the event the risk is higher than a pre-determined threshold.

2. The method according to claim 1, further including the step of using a slow coherency analysis to partition the generators into coherent groups.

3. The method according to claim 1, further including the step of placing PMUs at terminals of main generators in each of the coherent groups to measure rotor angles.

4. The method according to claim 1, further including the step of determining separation points and placing relays to isolate each of the coherent groups and form an island.

5. The method according to claim 1, further including the step of determining an average rotor angle of a coherent group.

6. The method according to claim 1, further including the step of applying analytic wavelet transform based damping estimation to determine the frequencies and damping ratios of a number of dominant oscillation modes.

7. The method according to claim 1, further including the step of applying spectral analysis to determine probable interfaces and dividing all of the coherent groups into two groups.

8. The method according to claim 1, further including the step of calculating an average rotor angle on opposing sides of the separation interface using data collected from PMUs placed at terminals of main generators in each of the coherent groups.

9. A phasor measurement units (PMU)-based controlled system separation method to protect against catastrophic blackouts, comprising the steps of:
   (a) partitioning generators into a number of coherent groups;
   (b) monitoring the coherent groups to predict an out-of-step pattern;
   (c) determining a separation interface that matches the predicted out-of-step pattern;
   (d) calculating a risk of angle separation at the determined separation interface;
   (e) comparing the calculated risk of angle separation to a pre-determined threshold; and
   (f) tripping specified relays once the calculated risk of angle separation becomes greater than the pre-determined threshold so as to provide controlled separation and form islands.

10. The method according to claim 9, further including the step of placing PMUs at pre-determined locations to monitor oscillations of the coherent groups.

11. The method according to claim 10, further including the step of predicting an angle separation for each of the coherent groups.

12. The method according to claim 9, further including the step of determining potential separation points and placing the relays at the separation points to enable separation of a single coherent group from the number of coherent groups.

13. The method according to claim 9, further including the step of using load shedding and generation rejection strategies for each island formed to stabilize generators and arrest frequency declines.

14. The method according to claim 9, further including the step of minimizing load-generation imbalance in each of island formed.

15. A phasor measurement units (PMU)-based controlled system separation method to protect against catastrophic blackouts, comprising the steps of:
   (a) performing an analysis of an electrical transmission network to partition generators into a number of coherent groups;
   (b) positioning PMUs at terminals of main generators in each of the coherent groups to measure rotor angles and determine an average rotor angle of each of the coherent groups;
   (c) using the differences between average rotor angles to periodically determine a number of dominant inter-area oscillation modes and their oscillation frequencies and damping ratios and predict an out-of-step pattern between coherent groups for each dominant inter-area oscillation mode;
   (d) predicting a separation interface for each dominant inter-area oscillation mode between coherent groups that match the predicted out-of-step pattern;
   (e) positioning relays at the separation points to enable separation of a single coherent group from the number of coherent groups;
   (f) calculating a risk of angle separation at all predicted separation interfaces and comparing the calculated risk of angle separation to a pre-determined threshold;
   (g) tripping specified relays at the separation interface where the calculated risk of angle separation is greater than the pre-determined threshold and blocking the relays where the calculated risk of angle separation is less than the pre-determined threshold to form islands; and
   (h) performing load shedding and generation rejection strategies for each island formed to stabilize generators and arrest frequency declines.

16. The method according to claim 15, further including the step of calculating the risk of angle separation in real-time.

17. The method according to claim 15, wherein a slow coherency analysis is used to partition the generators into coherent groups.

18. The method according to claim 15, wherein analytic wavelet transform based damping estimation is used to determine the oscillation frequencies and damping ratios.

19. The method according to claim 15, wherein spectral analysis is used to determine separation interfaces.

* * * * *